(12) United States Patent
Jang et al.

(10) Patent No.: US 6,992,902 B2
(45) Date of Patent: Jan. 31, 2006

(54) FULL BRIDGE CONVERTER WITH ZVS VIA AC FEEDBACK

(75) Inventors: Yungtaek Jang, Cary, NC (US); Milan M. Jovanović, Cary, NC (US)

(73) Assignee: DELTA Electronics, Inc., Taipei (TW)

( * ) Notice: Subject to any disclaimer, the term of this patent is extended or adjusted under 35 U.S.C. 154(b) by 25 days.

(21) Appl. No.: 10/644,906

(22) Filed: Aug. 21, 2003

(65) Prior Publication Data

US 2005/0041439 A1    Feb. 24, 2005

(51) Int. Cl.
    *H02M 3/335* (2006.01)
(52) U.S. Cl. .......................... 363/17; 363/132; 363/98
(58) Field of Classification Search ............... 363/17, 363/132, 98
    See application file for complete search history.

(56) References Cited

U.S. PATENT DOCUMENTS 5,563,775 A * 10/1996 Kammiller ................... 363/17
6,356,462 B1 * 3/2002 Jang et al. .................... 363/17

* cited by examiner

*Primary Examiner*—Shawn Riley
(74) *Attorney, Agent, or Firm*—Venable LLP; Robert S. Babayi

(57) ABSTRACT

A soft-switched, full-bridge pulse-width-modulated converter and its variations provide zero-voltage-switching conditions for the turn-on of the bridge switches over a wide range of input voltage and output load. The FB PWM converters of this invention achieve ZVS with a substantially reduced duty cycle loss and circulating current. The ZVS of the primary switches is achieved by employing an auxiliary circuit having an inductor and transformer to store energy for ZVS turn-on of the bridge switches.

25 Claims, 24 Drawing Sheets

[T₀ - T₁]

$[T_1 - T_2]$

[T₂ - T₃]

[T₃ - T₄]

[T₄ - T₅]

FULL BRIDGE CONVERTER WITH ZVS VIA AC FEEDBACK

BACKGROUND OF THE INVENTION

1. Field of the Invention

This invention generally relates to the field of power converters, and more particularly, to full bridge converters that operate with zero-voltage switching (ZVS).

2. Description of the Prior Art

Full-bridge switching power converters are a common DC/DC conversion topology used for supplying high power to a wide variety of electronic components, including telecommunication equipments, computers, servers, etc. A DC/DC switching converter contains an input port typically coupled to a DC power source, such as a battery, to provide DC power to a load connected to an output port. In general, full-bridge converters utilize two bridge legs with four switching elements in the primary side of a transformer that isolates the input port from the output port. Usually, a pulse width modulator is used to regulate the output voltage under various load conditions.

Important considerations in the design of converters include power density and conversion efficiency. Power density relates to the amount of delivered power relative to the volume occupied by the power converter, for example in terms of cubic centimeter or cubic inch. As such, for a specified power output, higher density power converters require a smaller size than lower density power converters. Another parameter influencing size of the converter is volt-second product that is applied to inductive converter elements. The volt-second product is a measure of maximum voltage applied during a period of time to the terminals of the inductive elements.

Power efficiency is the ratio of input power to output power, usually expressed in terms of percentages. Power efficiency is a measure of internal power losses when converting input power to output power. Switching power converters usually suffer from two types of losses: conduction losses and switching losses. Conduction losses are associated with energy dissipation in the form of heat due to resistive converter elements. Switching losses are associated with the switching elements of the power converter. A common approach utilized to minimize switching losses is known as zero voltage switching (ZVS).

A conventional full-bridge (FB) ZVS pulse-width-modulated (PWM) converter used in high-power applications is shown in FIG. 1. The major features of this converter are constant-frequency operation and ZVS of the primary switches with a reduced circulating energy. The control of the output voltage at a constant frequency is achieved by a phase-shift technique. In this technique, the turn-on of a switch in the $Q_3$–$Q_4$ leg of the bridge is delayed, i.e., phase shifted, with respect to the turn-on instant of the corresponding switch in the $Q_1$–$Q_2$ leg. If there is no phase-shift between the legs of the bridge, no voltage is applied across the primary of the transformer and, consequently, the output voltage is zero. On the other hand, if the phase shift is 180°, the maximum volt-second product is applied across the primary winding, which produces the maximum output voltage.

ZVS is achieved by discharging the energy stored injunction capacitances $C_1$, $C_2$, $C_3$ and $C_4$, of the switches $Q_1$, $Q_2$, $Q_3$ and $Q_4$ into an inductive element in order to avoid hard switching conditions, before the switches are turned on. In the circuit of FIG. 1, the ZVS of the lagging-leg switches $Q_3$ and $Q_4$ is achieved primarily by discharging the corresponding junction capacitances $C_3$ and $C_4$ via an output filter inductor $L_F$. Since the inductance of $L_F$ is relatively large, the storable energy in $L_F$ is sufficient to discharge this junction capacitances $C_3$ and $C_4$ of the switches $Q_3$ and $Q_4$ and, consequently, to achieve ZVS even at very light load currents, for example, when the delivered power to the load is substantially less than the rated power of the converter. However, the discharge of the junction capacitances $C_1$ and $C_2$ of the leading-leg switches $Q_1$ and $Q_2$ is done by the energy stored in the leakage inductance $L_{LK}$ of the transformer because during the switching of $Q_1$ or $Q_2$ the transformer primary is shorted by the simultaneous conduction of rectifiers $D_{R1}$ and $D_{R2}$ that carry the output filter inductor current. Since the leakage inductance $L_{LK}$ is small, the energy stored in $L_{LK}$ is also small so that ZVS of $Q_1$ and $Q_2$ is hard to achieve even at relatively high load currents, for example, when the delivered power to the load is at the rated power of the converter. The ZVS range of the leading-leg switches can be extended to lower load currents by increasing the leakage inductance of the transformer and/or by adding a large external inductor on the primary side in series with the primary of the transformer, as shown in FIG. 2. If properly sized, the external inductor $L_P$ can store enough energy to achieve ZVS of the leading-leg switches even at light load currents. However, a large external inductor also stores an excessive amount of energy at full load, i.e., when the delivered power is equal to the rated power, which produces a relatively large circulating energy that increases semiconductor components stress, as well as conversion efficiency.

In addition, a large inductance in series with the primary of the transformer extends the time that is needed for the primary current to change direction from positive to negative, and vice versa. This extended commutation time results in a loss of duty cycle on the secondary of the transformer, which further decreases the conversion efficiency. In order to provide full power at the output, the secondary-side duty-cycle loss can be compensated by reducing the turn-ratio of the transformer. With a smaller transformer turn-ratio, however, the reflected output current into the primary is increased, which increases the primary-side conduction losses, thereby creating undesired heat. Moreover, a smaller turn-ratio of the transformer increases the voltage stress on the secondary-side rectifiers. As a result, rectifiers with a higher voltage rating that typically have higher conduction losses may be required.

Yet another limitation of the circuit in FIG. 1 is a severe parasitic ringing at the secondary of the transformer during the turn-off of the rectifier. This ringing is caused by the resonance of the rectifier's junction capacitance with the leakage inductance of the transformer and the external inductor, if any. In order to control this secondary-side ringing, a snubber or clamp circuit can be employed. For implementations without an external inductor in the primary of the transformer, a passive R-C-D snubber on the secondary-side is usually used, as indicated by dashed lines in FIG. 2. For implementations with an external primary inductor the more efficient way to control the secondary-side ringing is to use primary-side clamp diodes $D_{C1}$ and $D_{C2}$, as shown in FIG. 2. This primary-side clamp circuit consisting of two clamp diodes was introduced and its operation described in U.S. Pat. No. 5,198,969 by Redl and Balogh. While this circuit offers a practical and efficient solution to the secondary-side ringing problem, it does not offer any improvement in the secondary-side duty-cycle loss.

A FB ZVS-PWM converter that achieves ZVS of the primary switches in the entire load and input voltage range with virtually no loss of secondary-side duty cycle and with minimum circulating energy was describe in U.S. Pat. No. 6,356,462 by Jang and Jovanović, which is assigned to the assigner of the present invention. This converter, shown in FIG. 3, employs a primary-side inductor connected to the primary center tap of the power transformer to achieve a wide-range ZVS. This converter utilizes the energy stored in the inductor to discharge the capacitance across any switch before it is turned on for achieving ZVS. At high loads, when the phase shift of the bridge is decreased, the inductor is subjected to the lowest volt-second product, with a minimum of 0 volts. At light loads, when the phase shift of the bridge is increased, the inductor is subjected to the highest volt-second product, with a maximum of $+-V_{IN}/2$. As described in U.S. Pat. No. 6,356,462, since the energy stored in the inductor is decoupled from the output, the inductor does not participate in the parasitic resonance with the junction-capacitance of the secondary-side rectifier.

By properly selecting the value of the inductance of the inductor, the primary switches in the converter of FIG. 3 can achieve ZVS even at no load. This is because the energy required to create ZVS conditions at light loads does not need to be stored in the leakage inductance, and thus, the transformer leakage inductance can be minimized. As a result, the loss of duty cycle on the secondary-side is also minimized, which maximizes the turns ratio of the transformer and, consequently, minimizes the conduction losses. In addition, the minimized leakage inductance of the transformer significantly reduces the secondary-side ringing caused by the resonance between the leakage inductance and junction capacitance of the rectifier, which greatly reduces the power dissipation of a snubber circuit that is used to dampen the ringing.

The energy storage capacity of the inductor used for storage of energy used to discharge junction capacitances that achieve ZVS is determined based on $e=L*i^2$, where e, L, and I correspond to energy, inductance and current, respectively. As described above, the conventional techniques have relied on increasing the inductance of the inductor used for ZVS energy storage. However, with the ever increasing need to increase power density or otherwise reduce the size of power converters, there is a requirement to decrease the size of the ZVS storage inductor. More specifically, a converter is needed that offers ZVS switching in a wide load range with an acceptable duty cycle loss and reduced primary-side inductor size that is also capable of storing the required energy for achieving ZVS.

SUMMARY OF THE INVENTION

Briefly, the present invention relates to a converter that provides ZVS in a wide range of input voltage and load current conditions. The converter has an input port for receiving an input power source and an output port for supplying current to a load. At least one power transformer having a primary side and a secondary side converts input power to output power. A bridge having one or more controllable switching devices on the primary side of the transformer operates under the control of a controller that regulates load current. An alternating energy source is coupled to the power transformer and the controllable switching devices, supplying the required energy for switching the controllable switching elements at a substantially low voltage. More specifically, the energy supplied by the alternating energy source is used to turn on the controllable switching devices at a substantially zero voltage. A primary inductor can be used for storing the energy required to create the conditions for switching at least one controllable switching device at substantially low voltage in order to avoid a hard switching condition. The low voltage switching condition can correspond to the condition that achieves ZVS. As such, instead of increasing the inductance for storing the necessary energy to discharge junction capacitances, the converter of the present invention increases the amount of current delivered to the primary inductor, without increasing its size.

In an exemplary embodiment, the alternating energy source is an auxiliary transformer and the bridge includes first and second legs, each comprising a pair of controllable switching devices. Unlike the power transformer, which has a power transfer function, the main function of the auxiliary transformer is to supply energy, albeit relatively small, for achieving ZVS. Under this arrangement, the control circuit regulates the power delivered to the load by periodically switching on and off the controllable switching devices in the first and second legs, thereby creating an isolated, constant-frequency, phase-shift-modulated FB ZVS-PWM converter.

Finally, it should be noted that the circuits of this invention can be implemented with any type of secondary-side rectifier, for example, a full-wave rectifier with a center-tap secondary winding, full-wave rectifier with a current doubler, or a full-bridge full-wave rectifier. In addition, in all embodiments of the present invention, the primary inductor used for ZVS energy storage can be eliminated by utilizing the leakage inductance of the auxiliary transformer to store the required energy.

DETAILED DESCRIPTION OF THE PREFERRED EMBODIMENT OF THE INVENTION

Figure 4:
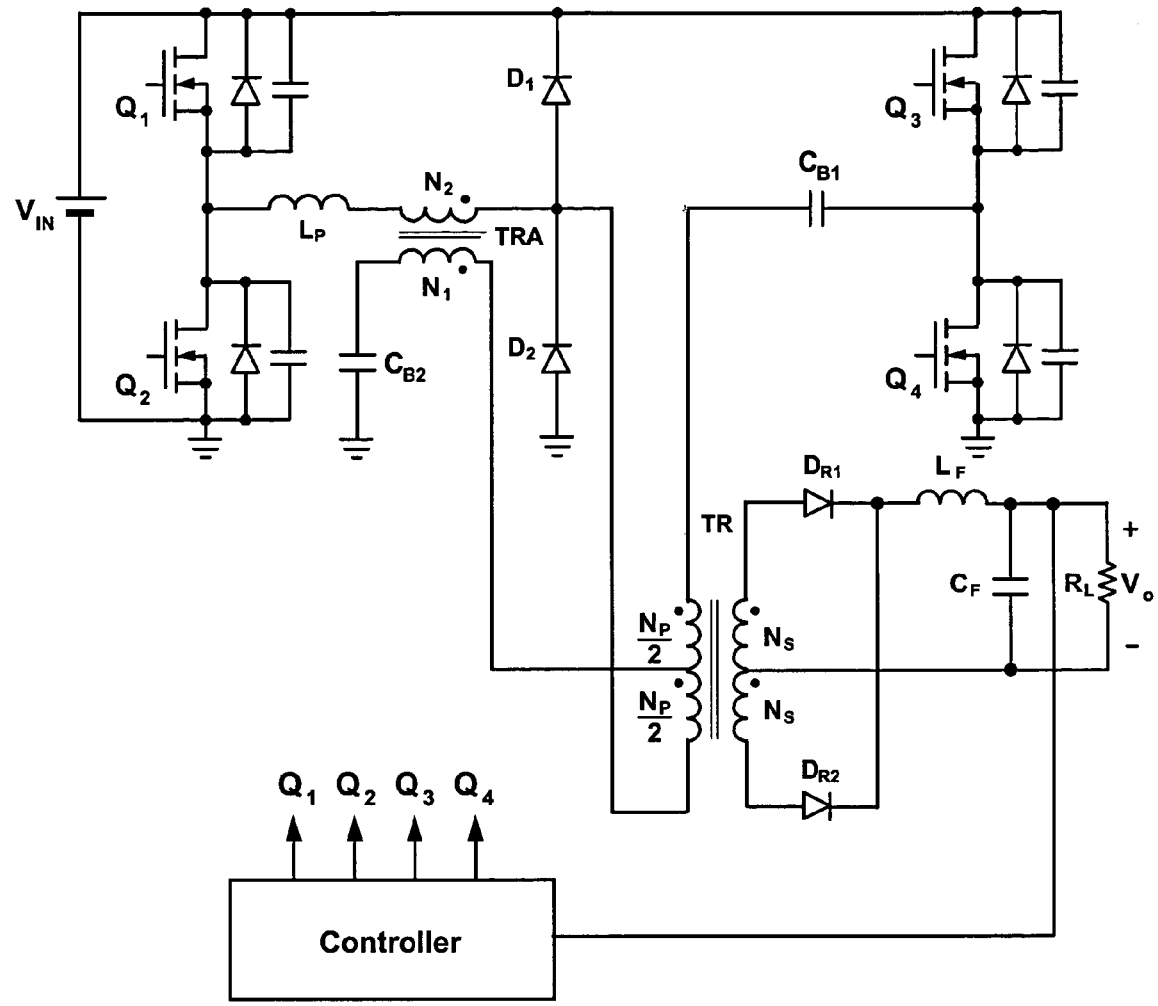
FIG. 4 shows an exemplary embodiment for a converter in accordance with the present invention.

FIG. 4 shows an exemplary embodiment for a converter in accordance with the present invention. The converter in FIG. 4 is a full bridge converter having an input port for receiving input power source $V_{IN}$ and an output port for supplying output power to load $R_L$. The converter employs power transformer TR, auxiliary transformer TRA, and a bridge comprising leading-leg primary switches $Q_1$ and $Q_2$ and lagging-leg primary switches Q3 and Q4, which are controllable switching devices. A controller regulates the load current by periodically switching controllable switching devices $Q_1$, $Q_2$, Q3 and Q4 into on and off states. Also included in the exemplary converter of the present invention is primary inductance $L_P$, capacitor $C_{B2}$, primary diodes $D_1$ and $D_2$, and blocking capacitor $C_{B1}$. On the secondary side, the converter in FIG. 4 includes rectifiers $D_{R1}$ and $D_{R2}$ and a low pass filter comprising $L_f$ and $C_f$. As described further in detail below, the present invention provides an isolated phase shift controlled full bridge converter that creates conditions for achieving ZVS, particularly for the leading-leg primary switches $Q_1$ and $Q_2$ under a wide range of load currents and with high power intensity.

Under this arrangement, power transformer TR is used for the transfer of input power to the output of the converter, while auxiliary transformer TRA functions as an alternating energy source that isolates primary transformer TR from the switches and provides the needed energy for achieving ZVS. As shown, power transformer TR and auxiliary transformer TRA are connected to the leading and lagging legs of the full bridge such that a change in the phase shift between the two legs changes the volt-second product on the windings of power transformer TR and auxiliary transformer TRA. More specifically, a change in the phase shift between the two legs of the bridge increases the volt-second product on the windings of one transformer and decreases the volt-second product on the windings of the other transformer. The load is connected to the secondary winding(s) of power transformer TR whose volt-second product increases as the phase shift between the two legs increases. The primary of auxiliary transformer TRA is connected to the center tap of power transformer TR and ground through blocking capacitor $C_{B1}$, whereas its secondary is connected in series with the primary winding of power transformer TR and the leading leg of the bridge through primary inductor $L_P$ that is employed to store the needed energy supplied by auxiliary transformer TRA for zero-voltage switching of the bridge switches $Q_1$ and $Q_2$. Finally, two diodes $D_1$ and $D_2$ are connected from the node connecting the primary of power transformer TR and the secondary of auxiliary transformer TRA to the positive and negative (ground) rail of the bridge to provide a path for the current through primary inductor $L_P$.

As described in more detail below, when the load current and/or input voltage changes, the phase shift between the bridge legs (comprising the leading-leg primary switches $Q_1$ and $Q_2$ and the lagging-leg primary switches Q3 and Q4) changes so that the volt-second product on the windings of power transformer TR also changes. At the same time, the volt-second product on the windings of auxiliary transformer TRA changes, which changes the energy stored in the primary inductor $L_P$. This is because the stored energy is proportional to the volt-second product of the secondary of auxiliary transformer TRA. As such, primary inductor $L_P$ is connected in series with the leading-leg primary switches $Q_1$ and $Q_2$ for storing the energy supplied by the alternating energy source of the invention, i.e., auxiliary transformer TRA, to create the necessary conditions for switching these controllable switching devices at a substantially low voltage, e.g., substantially zero voltage, so as to avoid hard switching conditions. Due to the adaptive nature of the energy stored in primary inductor $L_P$ which changes as the load current and/or input voltage changes, the present invention can achieve ZVS in a very wide range of input voltage and load current, including no load, with minimum circulating energy.

Because the ZVS energy stored in primary inductor $L_P$ is dependent on its inductance value and the volt-second product of the secondary of auxiliary transformer TRA, the size of primary inductor $L_P$ can be minimized by properly selecting the turns ratio of auxiliary transformer TRA. Consequently, the size of primary inductor $L_P$ can be reduced compared to the prior art implementations.

In addition, since auxiliary transformer TRA does not need to store energy and is used as an alternating energy source for supplying energy to primary inductor $L_P$, its size can be small. Also, because the sizes of primary inductor $L_P$ and auxiliary transformer TRA are determined by the converter's maximum output power through the selection of the bridge switches, in particular, their total output capacitance, the sizes of primary inductor $L_P$ and auxiliary transformer TRA do not change significantly as the maximum output power increases.

Moreover, since the energy used to create the ZVS condition at light loads is not stored in the leakage inductance of power transformer TR, the transformer's leakage inductance can also be minimized. As a result of the reduced total inductance, which comprises the inductance of primary inductor $L_P$ and the leakage inductance of power transformer TR, the converter of the invention exhibits a relatively small duty-cycle loss, which minimizes both the conduction loss of the primary switches and the voltage stress on the components of the secondary side of power transformer TR, thereby improving conversion efficiency. Additionally, because of the reduced total inductance, the secondary-side parasitic ringing caused by a resonance between primary inductance $L_P$ and the junction capacitance of rectifier comprising $D_{R1}$ or $D_{R2}$ is also reduced and is effectively controlled by primary side diodes $D_1$ and $D_2$, which are connected between the rails and the node connecting the primary of power transformer TR and the secondary of auxiliary transformer TRA.

Figure 5:
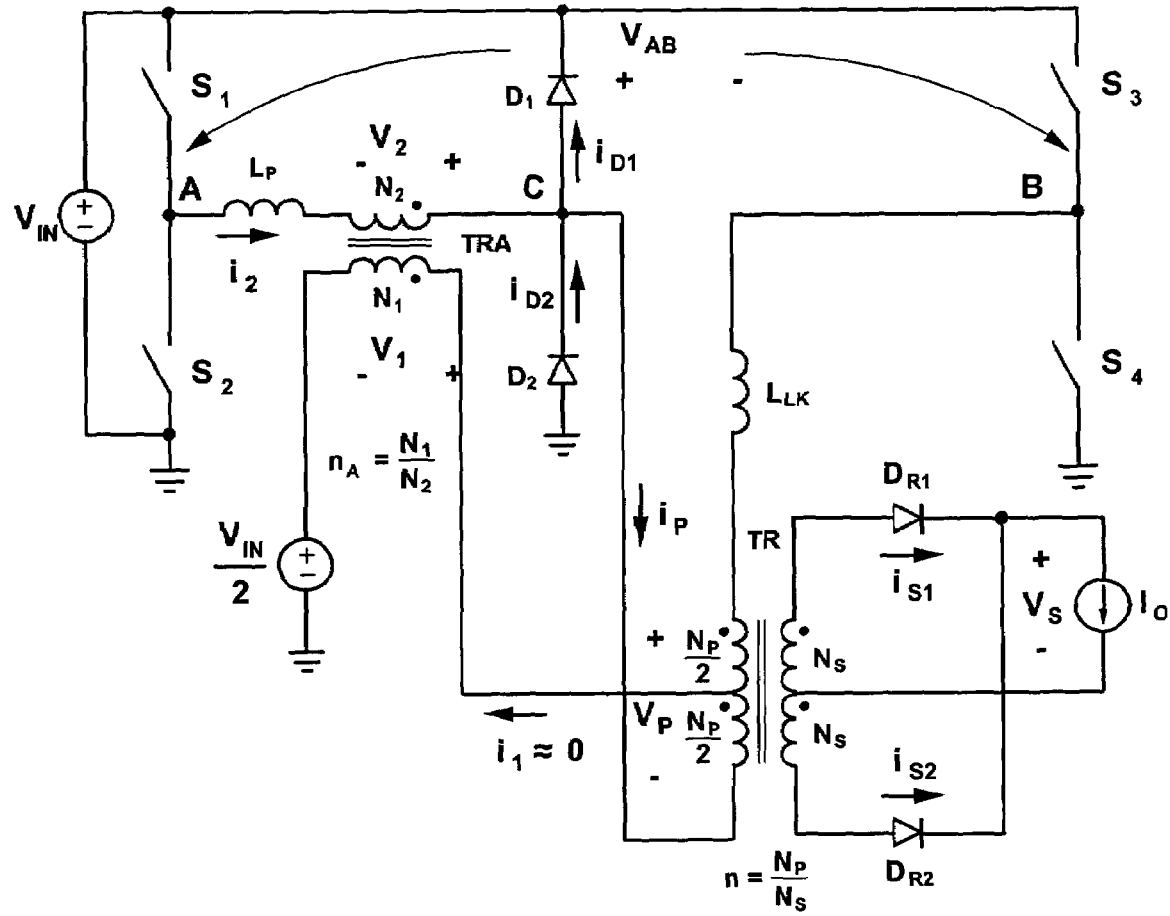
FIG. 5 shows a simplified circuit diagram for the converter of FIG. 4.

To facilitate the explanation of operation of the circuit in FIG. 4, FIG. 5 shows its simplified circuit diagram. In the simplified circuit is assumed that inductance of output filter $L_F$ is large enough so that during a switching cycle the output filter can be modeled as a constant current source with the magnitude equal to output current $I_O$. Also, it is assumed that the capacitance of capacitor $C_{B2}$ is large enough so that the capacitor can be modeled as a constant voltage source. Because the average voltage of the windings of both transformers TR and TRA during a switching cycle must be zero and because when the phase-shift control is used, the pair of switches in each bridge leg operate with 50% duty cycle, the magnitude of the voltage sources that models $C_{B2}$ is $V_{IN}/2$. Blocking capacitor $C_{B1}$, which is used to prevent the transformer core saturation due to various bridge component mismatching, can be neglected since it has no significant effect on the operation of the circuit.

In order to further simplify the analysis, it is assumed that the resistance of the conducting semiconductor switches is zero, whereas the resistance of the non-conducting switches is infinite. In addition, the leakage inductance of the auxiliary transformer TRA and the magnetizing inductances of both transformers are neglected since their effect on the operation of the circuit is not significant. However, capacitances of primary switches $C_1$–$C_4$ and the leakage inductance of power transformer $L_{LK}$ are not neglected in this analysis since they are important for understanding of the operation of the circuit. Finally, since the turns ratio of the auxiliary transformer TRA, $n_A=N_1/N_2$, is designed to be much greater than unity, current $i_1$ through winding $N_1$ of TRA is relatively small compared to primary current $i_P$ and can be neglected and is assumed to be $i_1=0$.

Figure 6A:
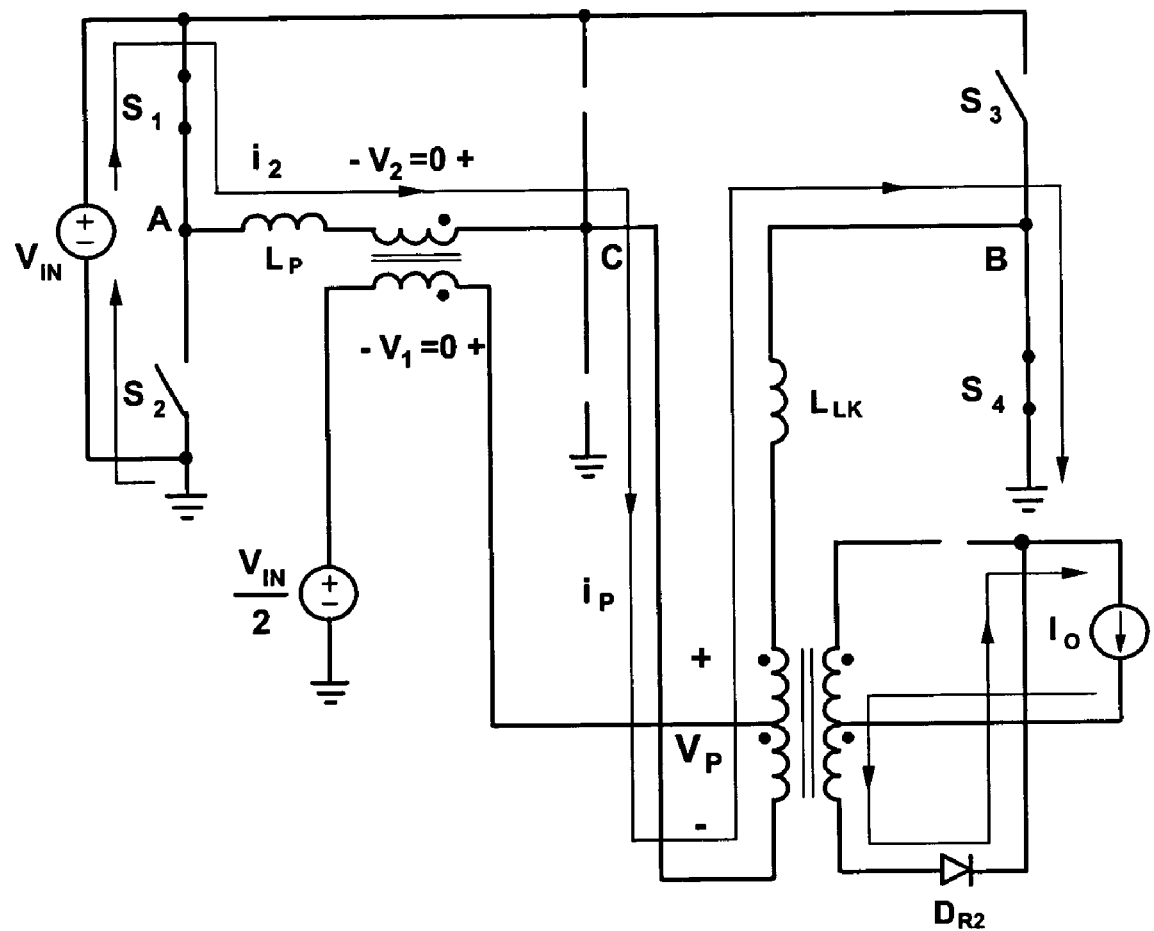
FIGS. 6(a)–(e) show topological stages during one half of the switching period of the converter of the invention: (a) topological stage $[T_0-T_1]$; (b) topological stage $[T_1-T_2]$; (c) topological stage $[T_2-T_3]$; (d) topological stage $[T_3-T_4]$; (e) topological stage $[T_4-T_5]$.
Figure 6B:
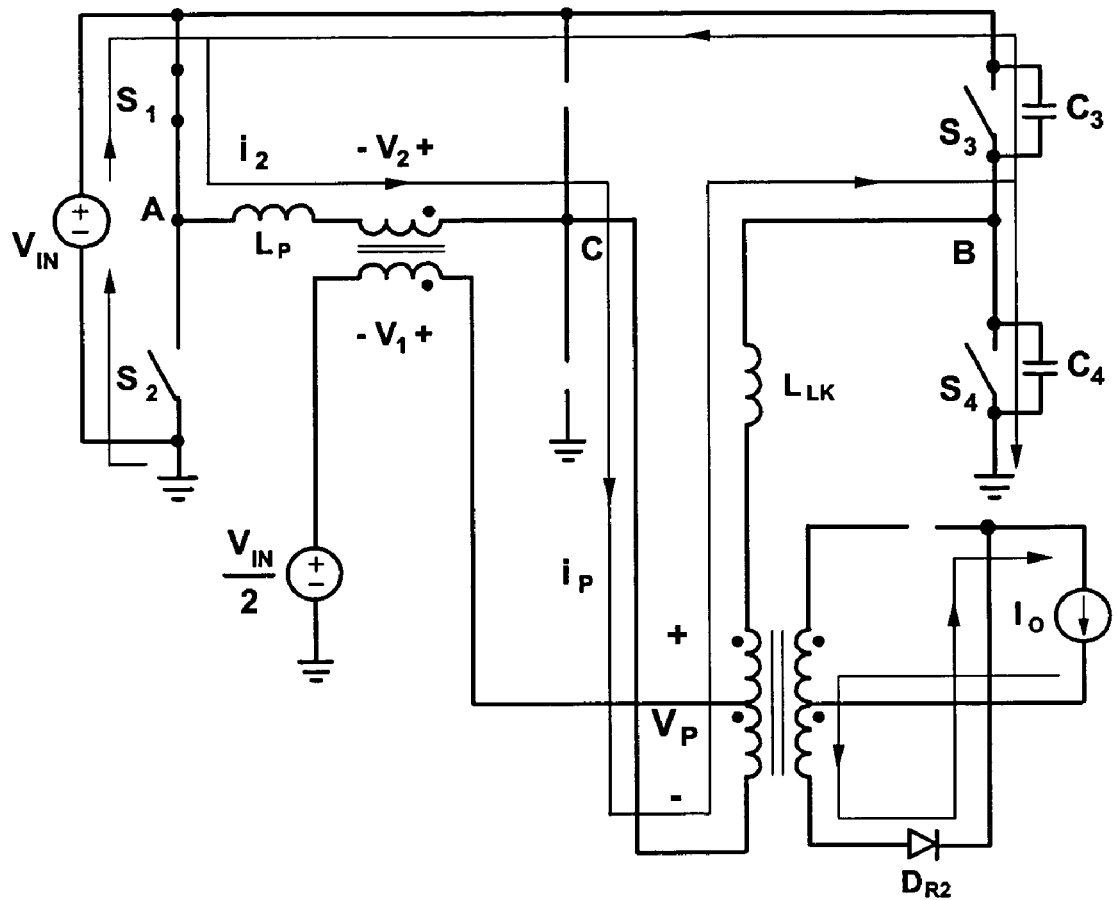
Figure 6C:
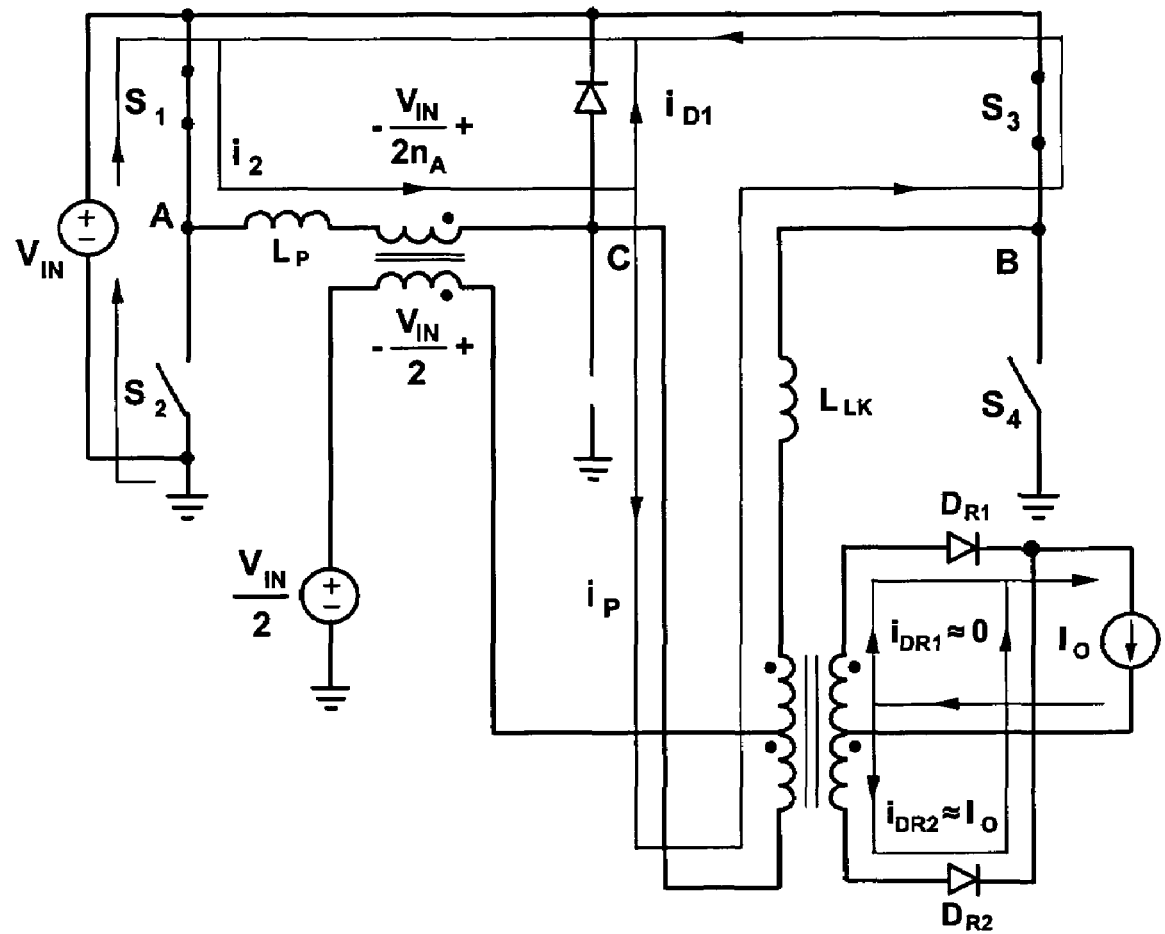
Figure 6D:
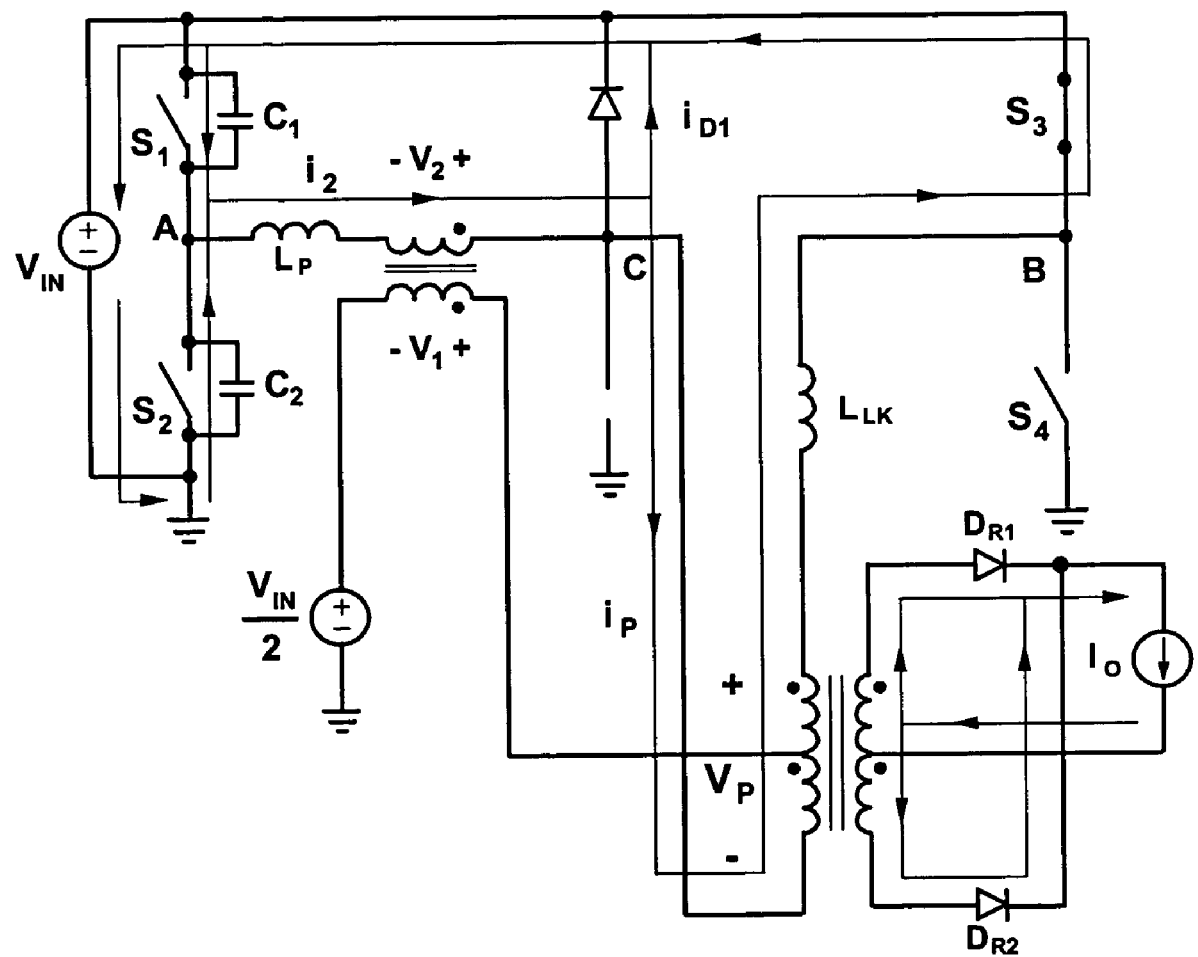
Figure 6E:
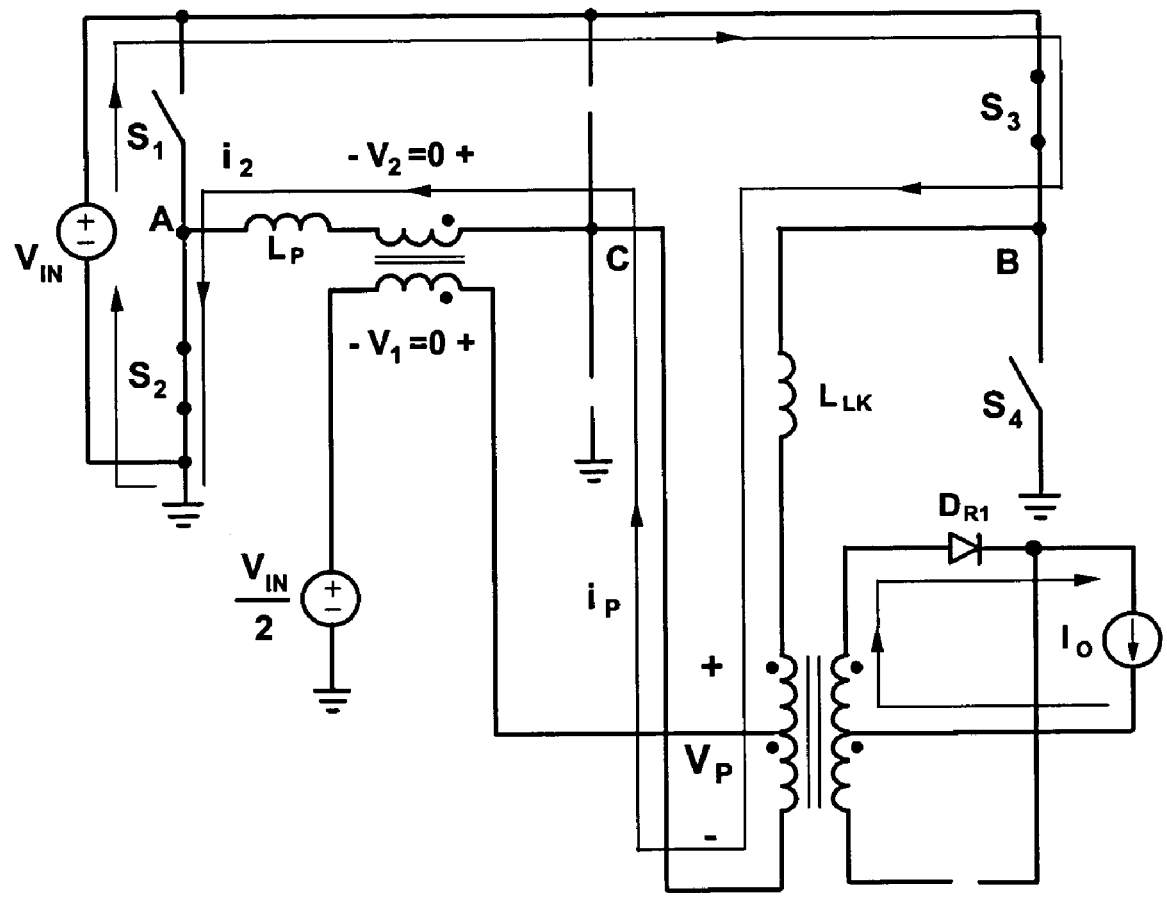
Figure 7:
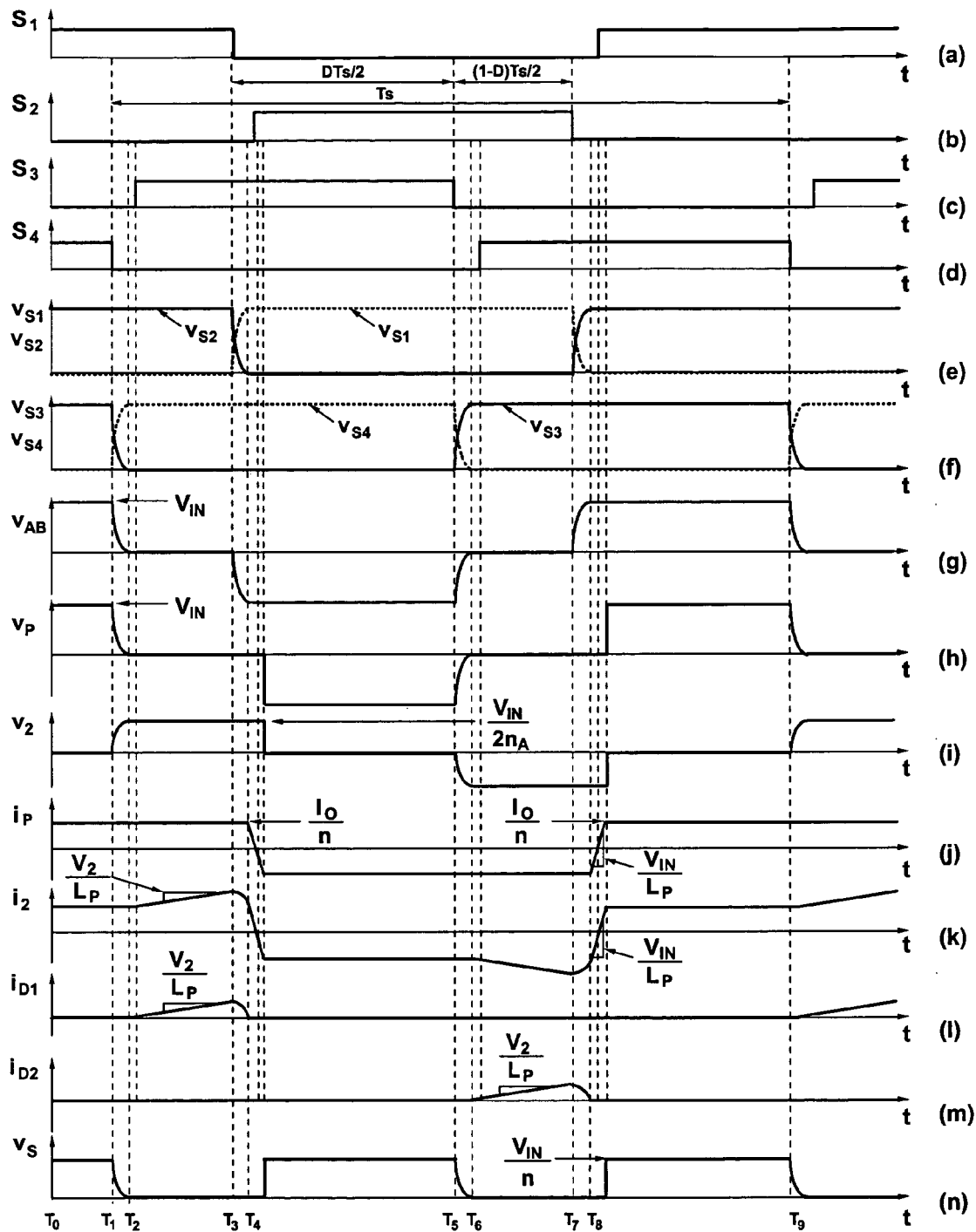
FIGS. 7(a)–(n) show key waveforms of the converter of this invention: (a) control signal for switch $S_1$; (b) control signal for switch $S_2$; (c) control signal for switch $S_3$; (d) control signal for switch $S_3$; (e) voltages $V_{S1}$ and $V_{S2}$ across switches $S_1$ and $S_2$; (f) voltages $V_{S3}$ and $V_{S4}$ across switches $S_3$ and $S_4$; (g) bridge voltage $V_{AB}$; (h) primary voltage $V_P$ of power transformer TR; (i) voltage $v_2$ of winding $N_2$ of auxiliary transformer TRA; (j) primary current $i_P$ of power transformer TR; (k) current $i_2$ through winding $N_2$ of auxiliary transformer TRA; (l) current $i_{D1}$ through diode $D_1$; (m) current $i_{D2}$ through diode $D_2$; (n) voltage $v_S$ at the input of output filter.
Figure 8:
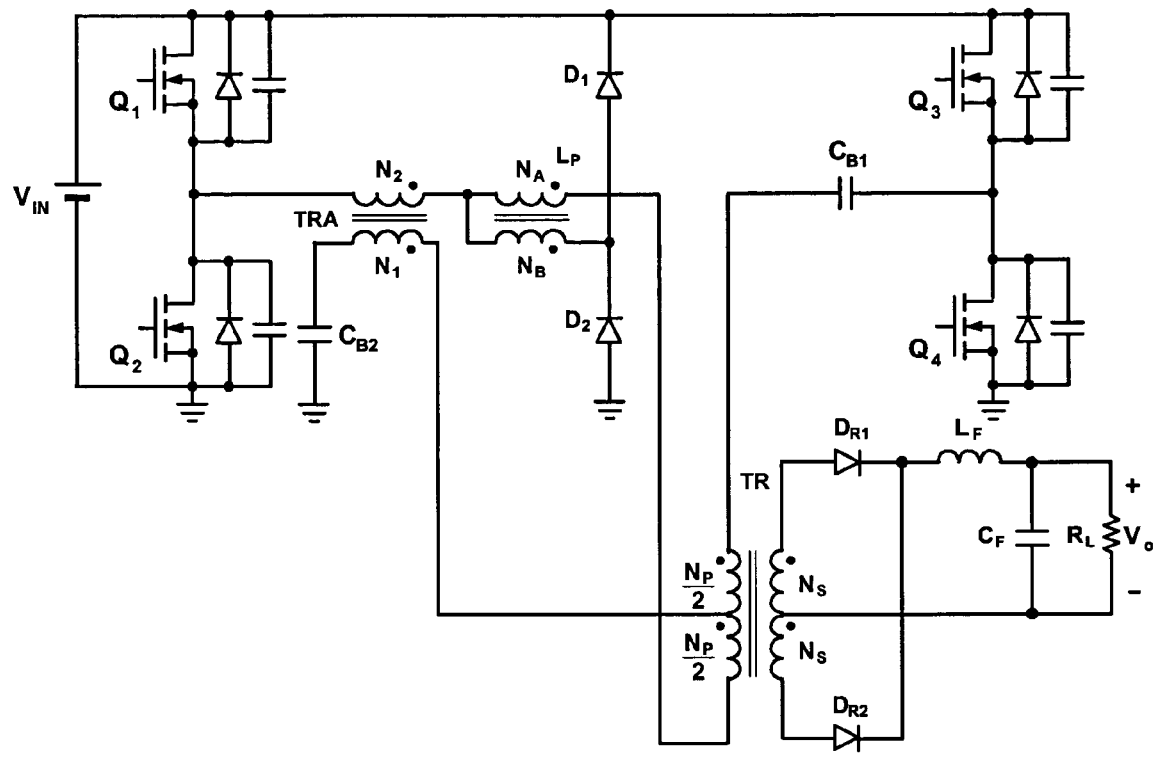
FIG. 8 shows another exemplary embodiment of the converter of the present invention with two winding coupled inductors.
Figure 9:
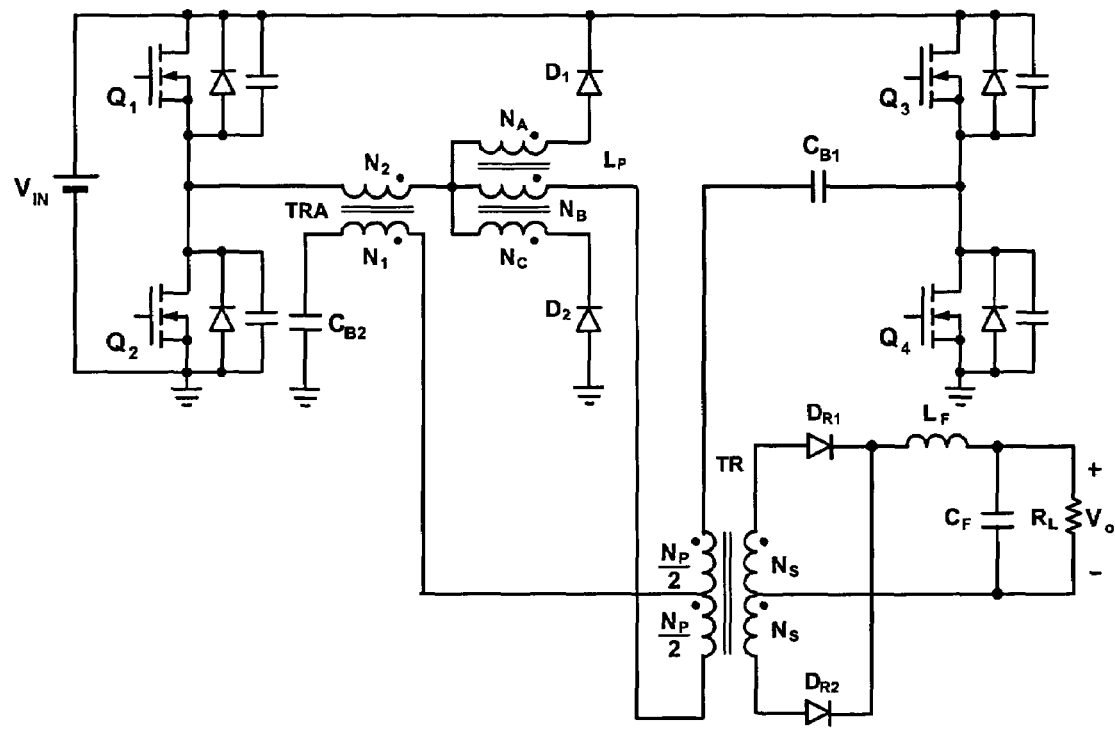
FIG. 9 shows another implementation of the converter of FIG. 8 with three-winding coupled primary inductor.
Figure 10:
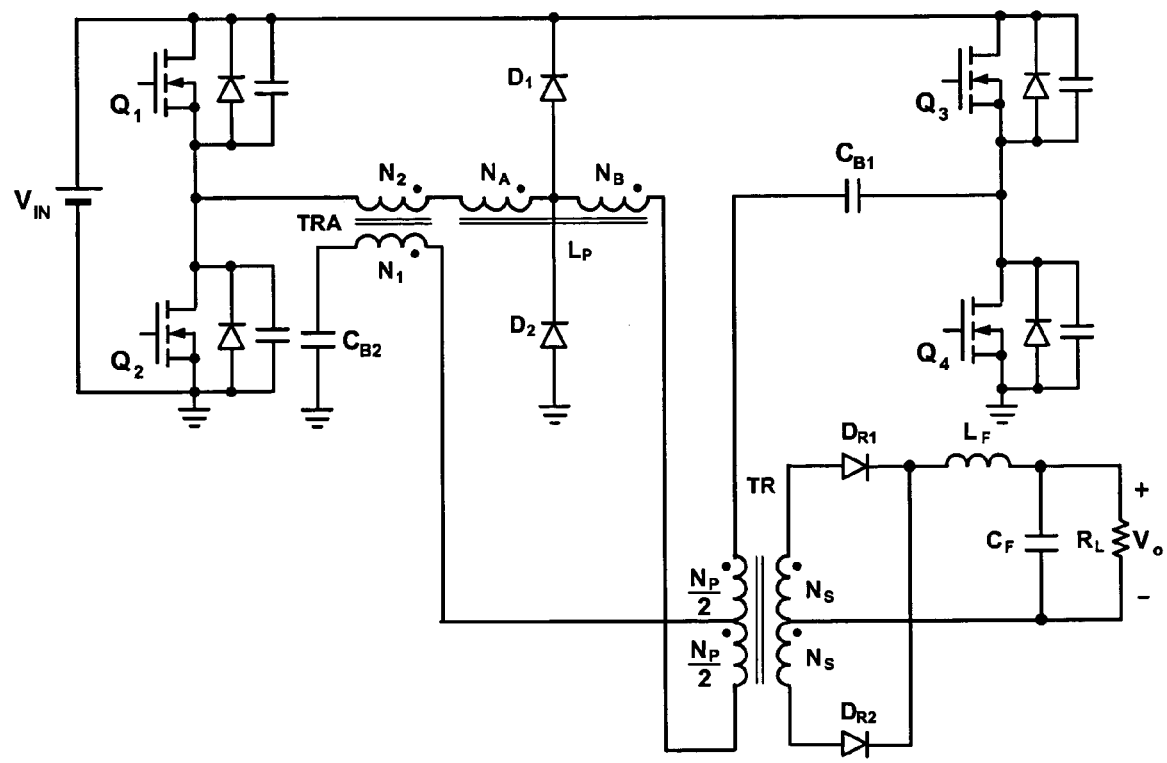
FIG. 10 shows yet another implementation of the converter of FIG. 8 with two-winding coupled primary inductor.
Figure 11:
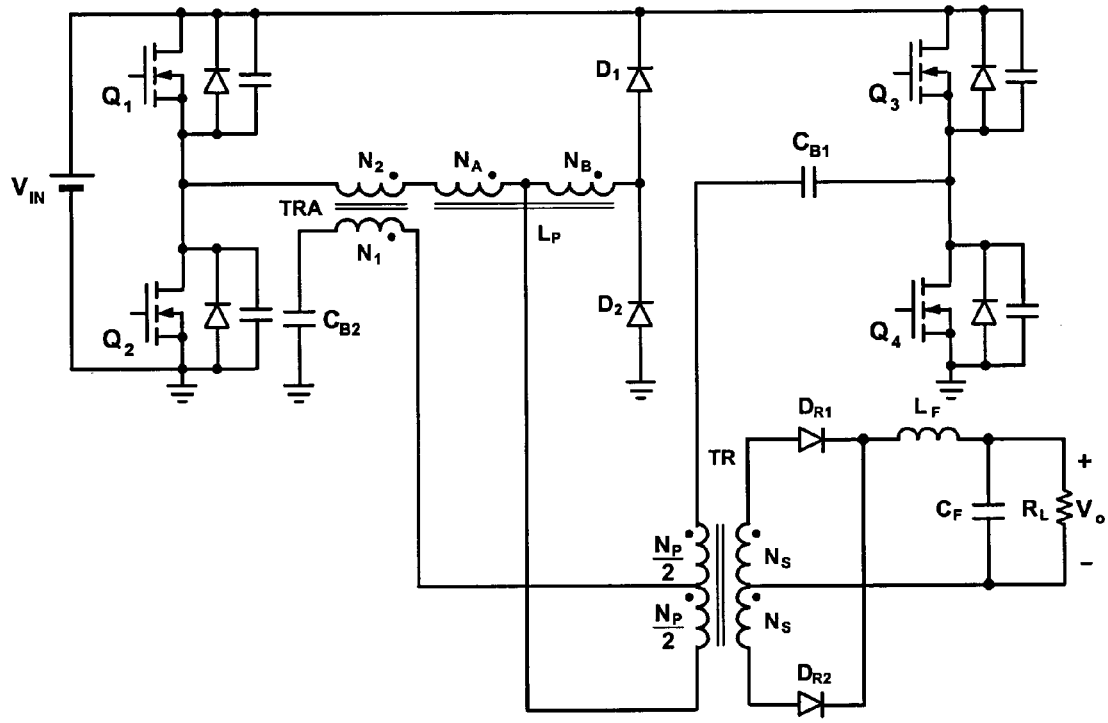
FIG. 11 shows yet another implementation of the converter of the present invention with two-winding coupled primary inductor.

FIGS. 6(a)–(e) show topological stages of the converter of this invention during a half of the switching period, whereas FIGS. 7(a)–(n) show its key waveforms. As shown in FIG. 6(a), when diagonal switches $S_1$ and $S_4$ are conducting, primary voltage $V_P$ is negative so that the load current is flowing through rectifier $D_{R2}$ and the lower secondary of power transformer TR. Since during this topological stage, diodes $D_1$ and $D_2$ are reverse biased, reflected primary current $i_P=I_O/n$, where $n=N_P/N_S$, is flowing through the closed switch $S_1$, primary inductor $L_P$, winding $N_2$ of the auxiliary transformer TRA, the primary winding of power transformer TR and closed switch $S_4$. It should be noted that in this topological stage, the voltages across the windings of auxiliary transformer TRA are zero, i.e., $V_1=V_2=0$, since the potential of the center tap of power transformer TR is $VP/2=V_{IN}/2$, as shown in FIG. 7(h).

After switch $S_4$ is turned off at t=$T_1$, primary current $i_P=I_O/n$ starts charging capacitance $C_4$ of switch $S_4$ and discharge capacitance $C_3$ of switch $S_3$, as shown in FIG. 6(b). As a result, voltage $V_{S4}$ across switch $S_4$ starts increasing toward $V_{IN}$, whereas voltage $V_{S3}$ across switch $S_3$ starts decreasing at the same rate toward zero. At the same time, auxiliary transformer TRA winding voltages $V_1$ and $V_2$ start increasing from zero to $V_{IN}/2$ and $V_{IN}/(2n_A)$, respectively. Because of the increasing voltage $V_2$, diode $D_1$ becomes forward biased, which clamps the potential of node C to $V_{IN}$.

Since the energy for charging $C_4$ and discharging $C_3$ is supplied from filter inductor $L_F$, which generally has a large inductance, even at low currents this energy is large enough to completely discharge $C_3$, as illustrated in FIG. 7(f). After $C_3$ is completely discharge, i.e., after voltage across switch $S_3$ reaches zero at t=$T_2$, primary current $i_P$ continues to flow through the antiparallel diode of switch $S_3$. To achieve ZVS of switch $S_3$, transistor of switch $S_3$ should be turned on during the conduction of its antiparallel diode, as shown in FIG. 7(c).

When the voltage across switch $S_3$ becomes zero, the voltage across power transformer TR also becomes zero since the primary of the transformer is shorted by simultaneous conduction of $S_3$ and $D_1$, i.e., because voltage $V_{CB}=0$. As a result, the secondary windings are also shorted so that rectifiers $D_{R1}$ and $D_{R2}$ can conduct the load current simultaneously. However, because of leakage inductance $L_{LK}$ of power transformer TR, almost the entire load current is carried by the lower secondary through rectifier $D_{R2}$ since no voltage is available to commutate the current, from lower secondary and $D_{R2}$ to upper secondary and $D_{R1}$ if ideal components are assumed. With real components, this commutation voltage exists, but is too small to commutate a significant amount of current from the lower to the upper secondary so that even with real components the majority of the current is still found in the lower secondary and its corresponding rectifier $D_{R2}$. As a result, during the topological stage when switches $S_1$ and $S_3$ are conducting, shown in FIG. 6(c), primary current $i_P$ stays virtually unchanged, i.e., $i_P=I_O/n$.

Since during the topological stage in FIG. 6(c) diode $D_1$ is conducting, voltage $V_2=V_{IN}/(2n_A)$ is applied directly across primary inductor $L_P$, which linearly increases current $i_2$ until switch $S_1$ is turned off at t=$T_3$, as illustrated in FIG. 7(l). During time interval $T_2$–$T_3$, linearly increasing current through diode $D_1$, $i_{D1}$, is given by $$i_{DI}(t) = \frac{V_2}{L_P} \cdot (t - T_2) = \frac{V_{IN}}{2n_A L_P} \cdot (t - T_2), \quad T_2 \leq t \leq T_3, \tag{1}$$

so that current $i_2$ is $$i_2(t) = i_P + i_{DI}(t) = \frac{I_O}{n} + \frac{V_{IN}}{2n_A L_P} \cdot (t - T_2), \quad T_2 \leq t \leq T_3. \tag{2}$$

After switch $S_1$ is turned off at t=$T_3$, current $i_2$ begins charging capacitance $C_1$ of switch $S_1$ and discharging capacitance $C_2$ of switch $S_2$, as shown in FIG. 6(d). For properly selected turns ratio $n_A$ of auxiliary transformer TRA and the value of inductance of $L_P$, energy stored in $L_P$ will be enough to discharge the capacitance of switch $S_2$ even at no load, as illustrated in FIG. 7(e). After capacitance $C_2$ is discharged, primary current $i_P=i_2$ continues to flow through the antiparallel diode of switch $S_2$ so that switch $S_2$ can be turned on with ZVS, as shown in FIG. 7(b).

Because in this topological stage voltage $V_{S1}$ across switch $S_1$ that is in opposition to voltage $V_2$ is increasing, current $i_{D1}$ starts decreasing. When current $i_{D1}$ becomes zero at t=$T_4$, diode $D_1$ stops conducting so that primary current $i_P=i_2$ starts decreasing because a negative voltage appears across primary inductor $L_P$ and transformer leakage inductance $L_{LK}$. At the same time, load current $I_O$ begins commutating from the lower secondary and its rectifier $D_{R2}$ into the upper secondary and its corresponding rectifier $D_{R1}$. The rate of change of the primary current is given by $$\frac{di_P}{dt} = -\frac{V_{IN}}{L_P + L_{LK}} \approx -\frac{V_{IN}}{L_P} \quad (3)$$

since $L_P \gg L_{LK}$.

When the commutation of the load current from the lower to the upper secondary is completed, the primary current commutation from positive to negative direction is also finished so that the primary current is $i_P = -I_O/n$. After the primary current is commutated in the negative direction, voltages $V_1$ and $V_2$ of the windings of auxiliary transformer TRA quickly collapse to zero, as illustrated in FIG. 7(h).

The circuit stays in the topological mode shown in FIG. 6(e) with diagonal switches $S_2$ and $S_3$ turned on until switch $S_3$ is turned off at $t = T_5$, which marks the end of the first half of the switching period and the beginning of the second half of the switching period. In the second half of the switching period the operation of the circuit is exactly the same as the operation in the first half of the switching period.

As already explained, in the connector shown in FIG. 4, lagging-lag switches $S_3$ and $S_4$ can achieve a complete ZVS turn on even at very light load currents because the energy for creating ZVS conditions is stored in large filter inductor Lf. However, to achieve ZVS of leading-leg switches $S_1$ and $S_2$ in a wide load range it is necessary to store enough energy in primary inductor $L_P$ by properly selecting turns ratio $n_A$ of auxiliary transformer TRA and the inductance value of $L_P$. The total energy stored in inductor $L_P$ prior to the turn off of a leading-leg switch and the subsequent turn on of the other leading-leg switch is given by $$E_{LP} = \frac{1}{2} L_P i_2^2, \quad (4)$$

Where $i_2$ is the value of $i_2$ at the moment of turn off of a leading-leg switch, i.e., at $t = T_3$ and $t = T_7$ in FIGS. 7(a) and (b).

Since $$i_2(t = T_3) = \frac{I_O}{n} + i_{D1}(t = T_3) \quad (5)$$

and $$i_2(t = T_7) = -\left(\frac{I_O}{n} + i_{D2}(t = T_7)\right), \quad (6)$$

substituting expression (1) for $i_{D1}$ and $i_{D2}$ into (4) and recognizing that $i_{D1}$ and $i_{D2}$ flow only during the off time $(1-D)T_S$, as shown in FIGS. 7(l) and (m), the stored energy in $L_P$ available for ZVS of leading-leg switches can be expressed as $$E_{LP} = \frac{1}{2} L_P \left(\frac{I_O}{n} + \frac{V_{IN}}{2n_A L_P}(1-D)T_S\right)^2 = \frac{1}{2} L_P \left(\frac{I_O}{n} + \frac{V_{IN}(1-D)}{2n_A L_P f_S}\right)^2, \quad (7)$$

where $f_S = 1/T_S$ is the switching frequency.

Neglecting the transformer winding capacitances and any other parasitic capacitance, to achieve ZVS of leading-leg switches, stored energy $E_{LP}$ must be at least equal to the energy required to charge up the capacitance of the leading-leg switch that is turning off to $V_{IN}$ and discharge the capacitance of the leading-leg switch that is about to be turned on to zero, i.e., $$E_{LP} \geq 2CV_{IN}^2. \quad (8)$$

From (7) and (8), it follows that the ZVS condition is $$L_P \left(\frac{I_O}{n} + \frac{V_{IN}(1-D)}{2n_A L_P f_S}\right)^2 \geq 4CV_{IN}^2. \quad (9)$$

As can be seen from (9), at full load $I_{O(MAX)}$ almost the entire energy stored in $L_P$ is from the output current reflected into the primary since for a properly designed converter $D \approx 1$ at full load. Therefore, at full load the ZVS condition can be expressed as $$L_P \left(\frac{I_{O(MAX)}}{n}\right)^2 \geq 4CV_{IN}^2. \quad (10)$$

However, according to (9), at no load ($I_O = 0$) the entire energy stored in $L_P$ is due to currents $i_{D1}$ or $i_{D2}$. Since at no load (or light loads) $D \ll 1$, the ZVS condition at no load can be rewritten as $$L_P \left(\frac{V_{IN}}{2n_A L_P f_S}\right)^2 \geq 4CV_{IN}^2. \quad (11)$$

Expressions (10) and (11) can be used to estimate the required value of primary inductance $L_P$ and the turns ratio of auxiliary transformer $n_A$. From (10), $L_P$ can be calculated as $$L_P \geq \frac{4CV_{IN(MAX)}^2}{(I_{O(MAX)}/n)^2}, \quad (12)$$

where $V_{IN(MAX)}$ is the high line input voltage since it represents the worst-case input voltage. To minimize amount of the full load circulating energy and the size of inductor $L_P$, the smallest value of $L_P$ that satisfies (12) should be taken, i.e., $$L_P \approx \frac{4CV_{IN(MAX)}^2}{(I_{O(MAX)}/n)^2}. \quad (13)$$

Once $L_P$ is determined according to (13), the desired range of $n_A$ can be calculated from (11) as $$n_A \leq \frac{1}{4f_S \sqrt{CL_P}}. \quad (14)$$

To minimize the amount of no-load circulating energy and the size of the auxiliary transformer, the turns ratio of the auxiliary transformer should be maximized, i.e., $n_A$ should be selected so that $$n_A \approx \frac{1}{4 f_S \sqrt{CL_P}}. \quad (15)$$

With $L_P$ and $n_A$ selected according to (13) and (15), the circuit of this invention achieves a complete ZVS in the entire load range, i.e., from full load down to no load.

Figure 1:
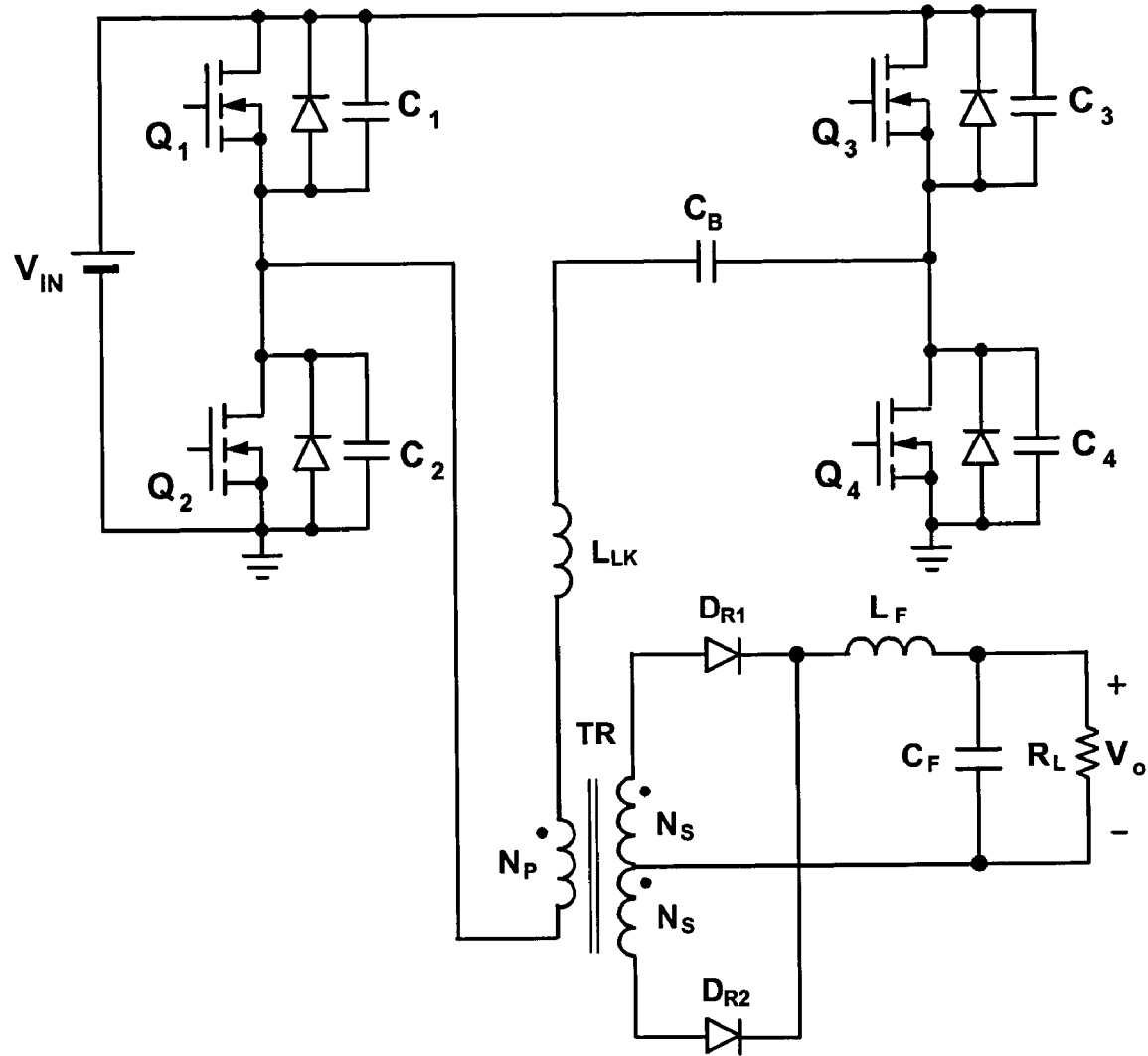
FIG. 1 shows a conventional full-bridge ZVS-PWM converter.
Figure 2:
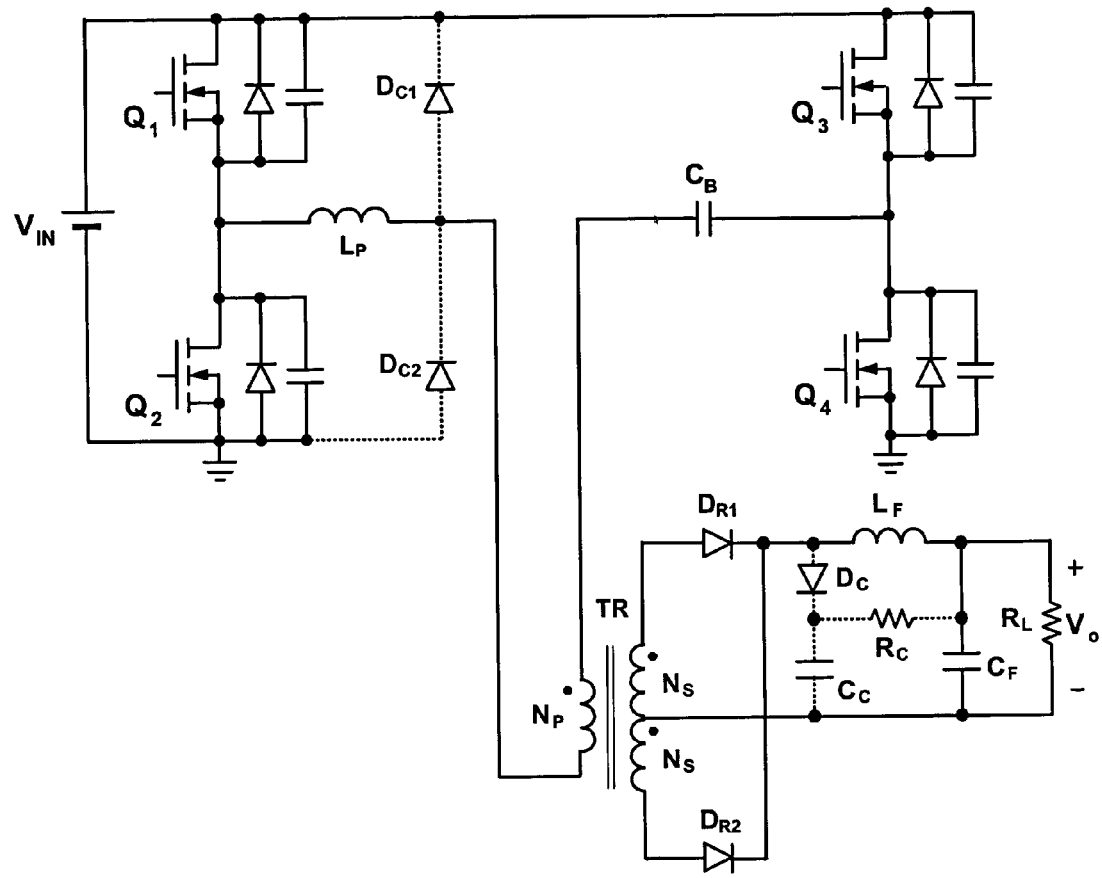
FIG. 2 shows another conventional full-bridge ZVS-PWM converter with the primary inductor for ZVS energy storage. Also shown with dashed lines are the secondary-side passive R-C-D snubber and primary-side clamp diodes in accordance with a prior art implementation.
Figure 3:
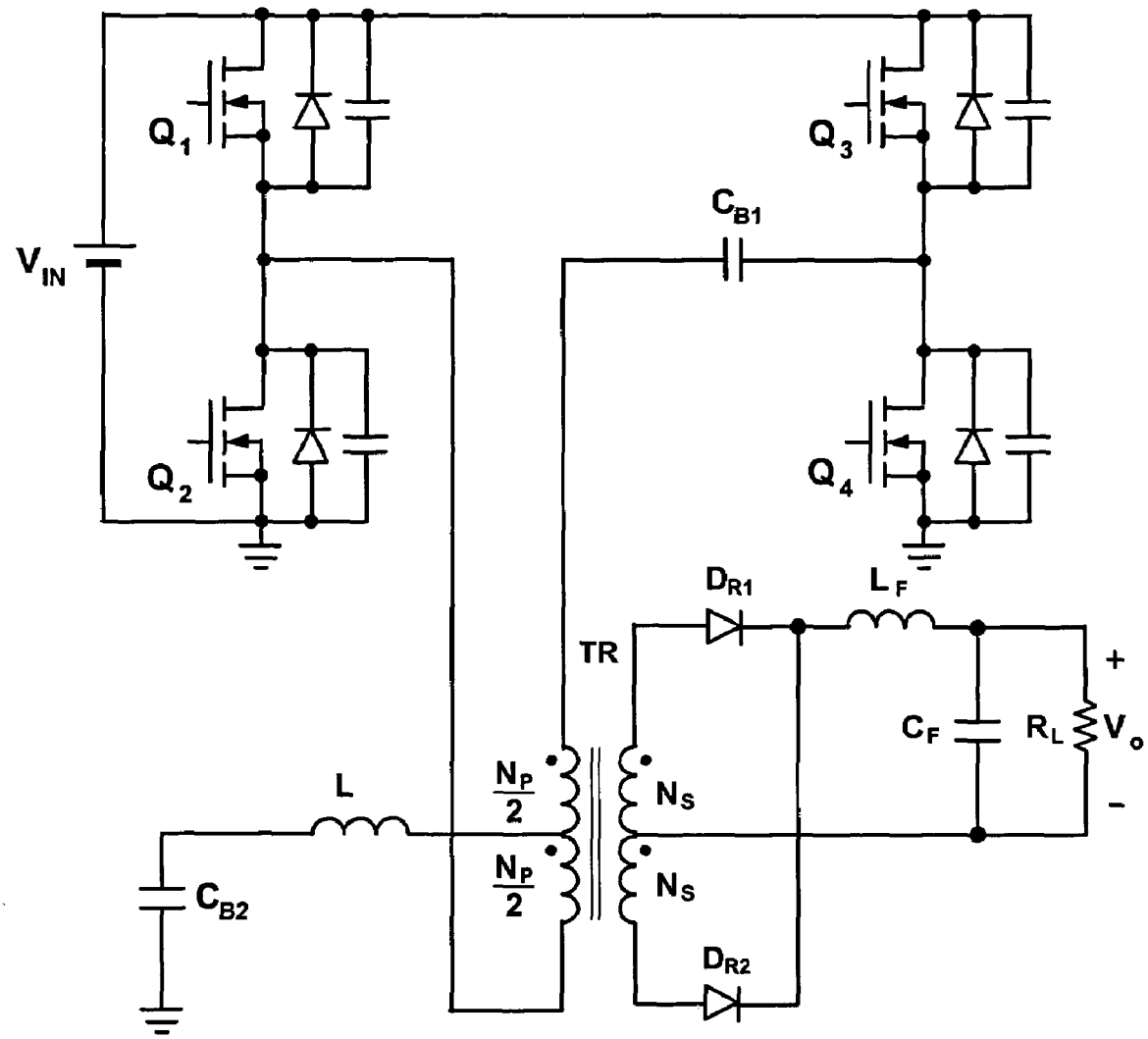
FIG. 3 shows yet another full-bridge ZVS-PWM converter.

It should be noted that the value of primary inductance $L_P$ in the circuit of this invention is many times smaller than the value of primary inductance $L_P$ required to achieve ZVS of the primary switches in the conventional phase-shifted converter shown in FIG. 2. In fact, the value of $L_P$ in the conventional converter $L_{P(CONV)}$ is determined by the condition that $L_{P(CONV)}$ has enough energy to achieve ZVS at the minimum desirable current, i.e., $$L_{P(CONV)} \geq \frac{4CV_{IN(MAX)}^2}{(I_{O(MIN)}/n)^2}, \quad (16)$$

where $I_{O(MIN)}$ is the minimum current at which complete ZVS can be achieved.

From (13) and (16), the ratio of the values of the primary inductor in the circuit of this invention and the conventional circuit is $$\frac{L_P}{L_{P(CONV)}} = \left(\frac{I_{O(MIN)}}{I_{O(MAX)}}\right)^2. \quad (17)$$

Therefore, to achieve ZVS in the conventional circuit from full load $I_{O(MAX)}$ down to only 50% of full load, $L_{P(CONV)}$ must be four times larger than $L_P$ in the circuit of this invention. To extend the ZVS range down to 30% of full load, $L_{P(CONV)}$ that is nine times larger than $L_P$ is required. The required value of $L_{P(CONV)}$ can be somewhat reduced by increasing the magnetizing current (reducing the magnetizing inductance) of the transformer, since the increased magnetizing current that flows through $L_{P(CONV)}$ increases the energy stored in $L_{P(CONV)}$. Even with the optimally selected magnetizing inductance of the transformer, the required $L_{P(CONV)}$ is substantially larger than required $L_P$ in the circuit of this invention.

Because of a substantially reduced value of primary inductance $L_P$ compared to the required value of $L_{P(CONV)}$ in the conventional phase-shifted full-bridge converter, the secondary-side duty-cycle loss of the circuit of this invention is also substantially reduced compared to that of the conventional full-bridge ZVS-PWM converter. At the same time, the reduced value of $L_P$ reduces the energy in the parasitic ringing on the secondary side. In fact, this parasitic ringing is very much suppressed in the circuit in FIG. 4 because diodes $D_1$ and $D_2$ clamp the primary voltage of power transformer TR to the input voltage. Since the leakage of the power transformer in the circuit of this invention can be minimized because it is not used to store ZVS energy, the primary winding clamping also effectively clamps the secondary winding voltage. Any parasitic ringing due to the residual leakage inductance of the transformer can be controlled with a small (low-power) snubber circuit.

Figure 12:
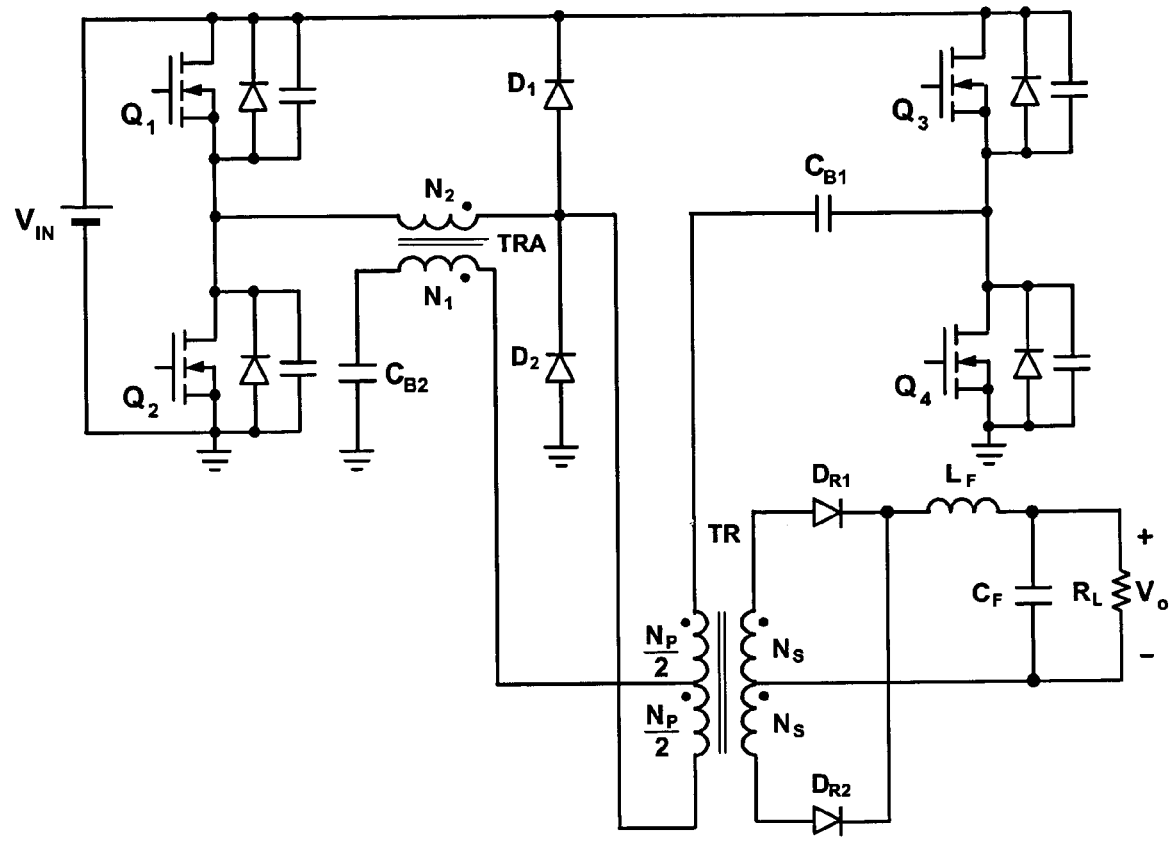
FIG. 12 shows an example of the implementation of the converter of the invention where ZVS energy is stored in the leakage inductance of auxiliary transformer TRA.

The exemplary circuit of this invention shown in FIG. 4 can be implemented in a variety of ways. For example, FIGS. 8 through 11 show some of the implementations with primary inductor $L_P$ implemented as a two- or three-winding coupled inductor. The principle of operation of the circuits in FIGS. 8 through 11 is the same as that of the circuit in FIG. 4. It also should be noted that the circuit of this invention can be implemented without inductor $L_P$, as shown in FIG. 12. In the implementation in FIG. 12, the energy required for ZVS of leading-leg switches is stored in the leakage inductance of auxiliary transformer TRA. Of course, this implementation requires that auxiliary transformer TRA be designed with a proper value of the leakage inductance.

Figure 13:
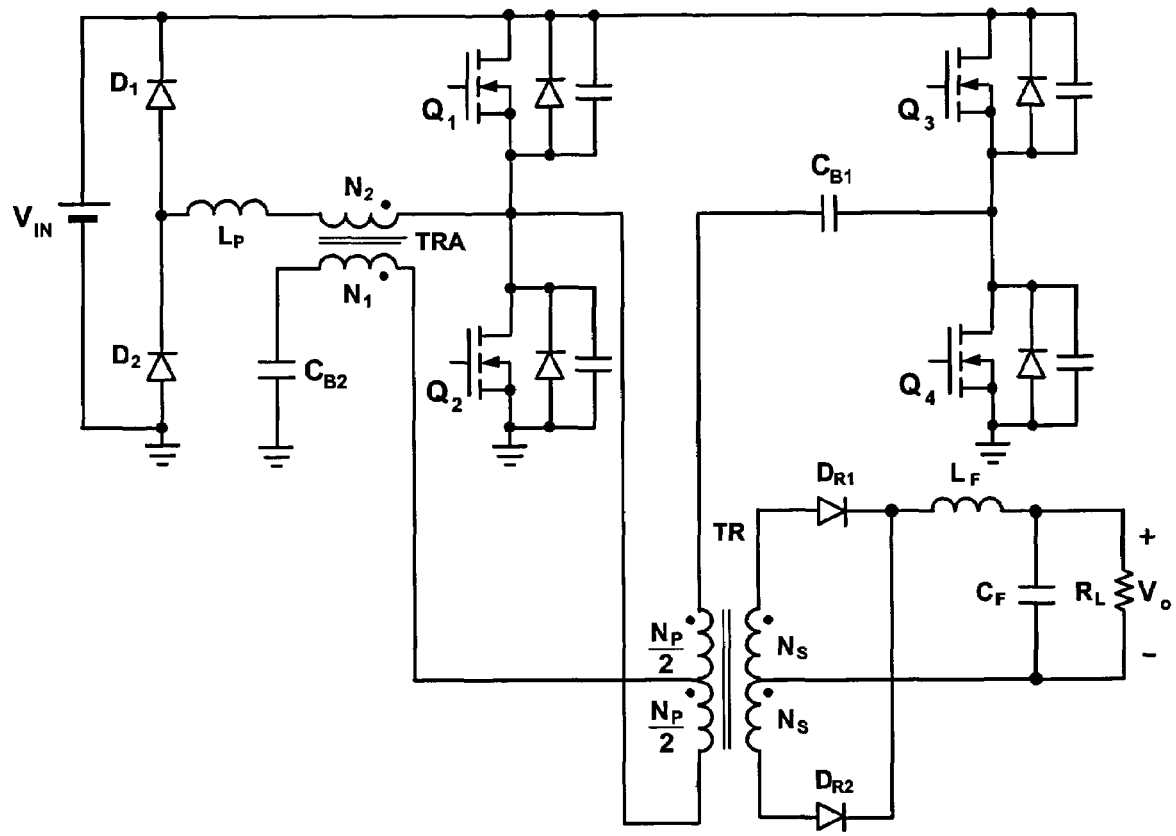
FIG. 13 shows an example of the implementation of the converter of the invention with power transformer TR connected directly across a bridge.

The circuit of this invention can also be implemented as shown in FIG. 13. In the implementation in FIG. 13, power transformer TR is directly coupled across the bridge legs so that the reflected load current into the primary is not flowing through primary inductor $L_P$. By minimizing the leakage inductance of power transformer TR, the secondary-side duty-cycle loss can virtually be eliminated.

Figure 14:
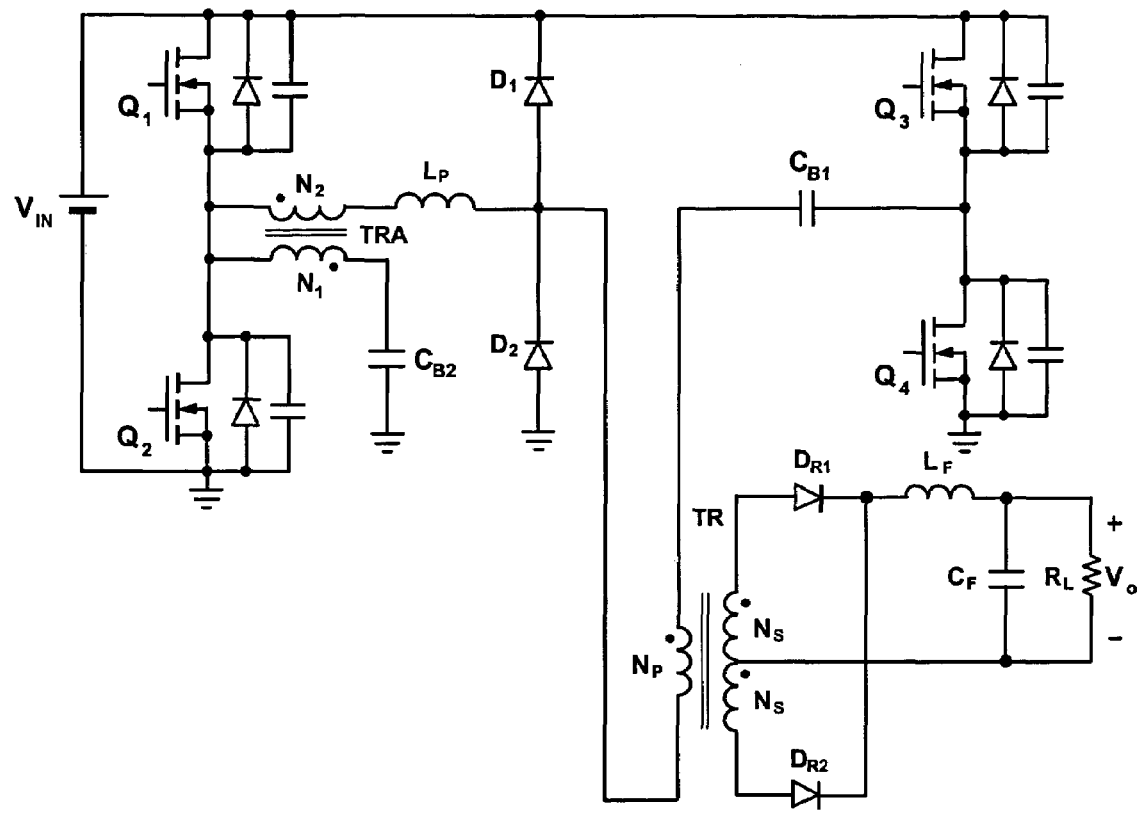
FIG. 14 shows the implementation of the converter of the invention with winding $N_1$ of the auxiliary transformer connected to the midpoint of the leading leg of a bridge.
Figure 15:
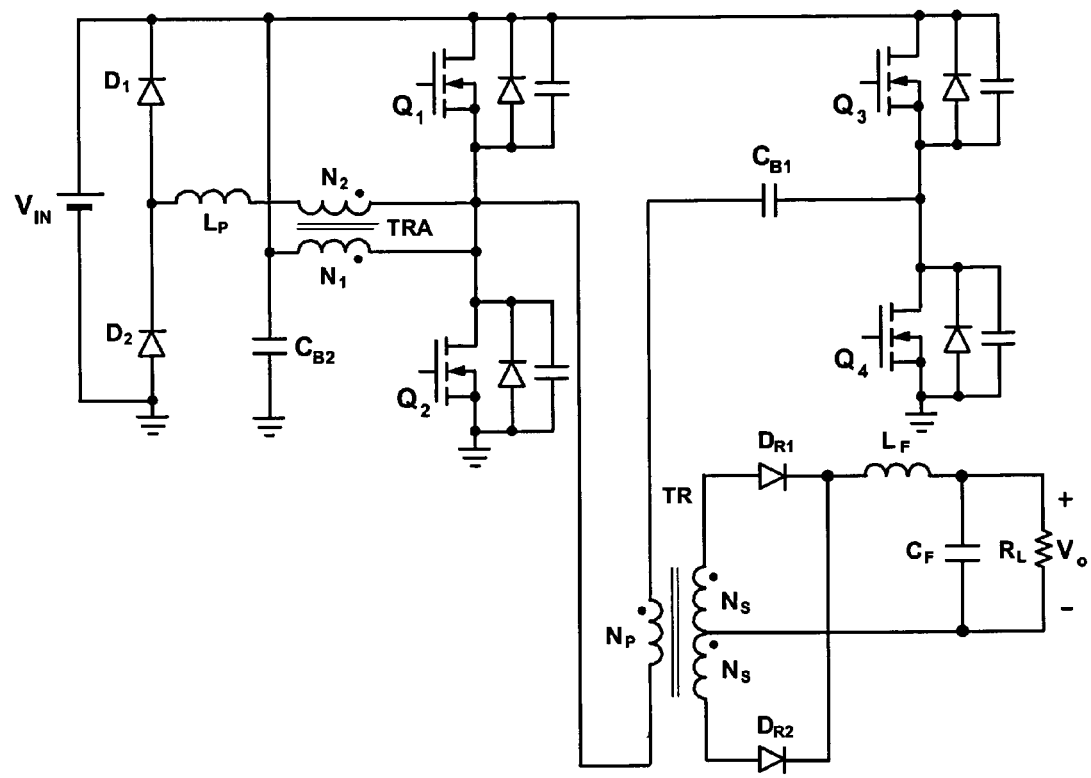
FIG. 15 shows an example of the implementation of the converter of the invention with winding $N_1$ of the auxiliary transformer connected to a capacitive voltage divider.

Generally, the circuits of this invention can also be implemented by connecting winding $N_1$ of auxiliary transformer TRA to any point in the circuit whose average voltage is $V_{IN}/2$ instead of connecting it to the center tap of power transformer TR. An example of this implementation is shown in FIG. 14. The only difference between the circuit in FIG. 14 and the circuit in FIG. 4 is that the amount of energy stored in primary inductor $L_P$ in the circuit in FIG. 14 is independent of the load current and input voltage since a constant volt-second product is applied across $L_P$ because, with the phase-shift control, the leading-leg switches always operate with 50% duty cycle. FIG. 15 shows another implementation of the circuit in FIG. 14, where winding $N_1$ is connected to a capacitive divider that provides voltage $V_{IN}/2$. Under this arrangement, the energy supplied by the alternating energy source is independent of current changes within the converter.

Figure 16:
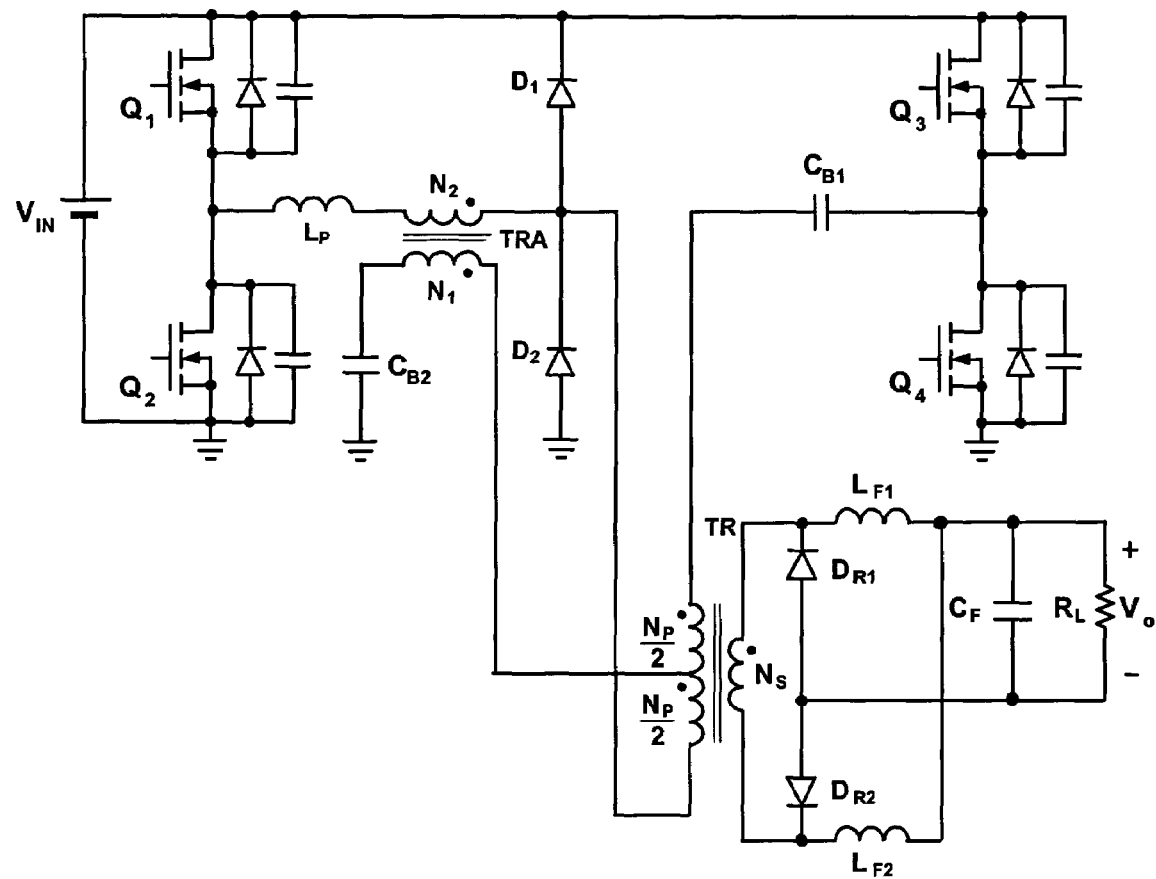
FIG. 16 shows the implementation of the converter of the invention with a current-doubler rectifier.
Figure 17:
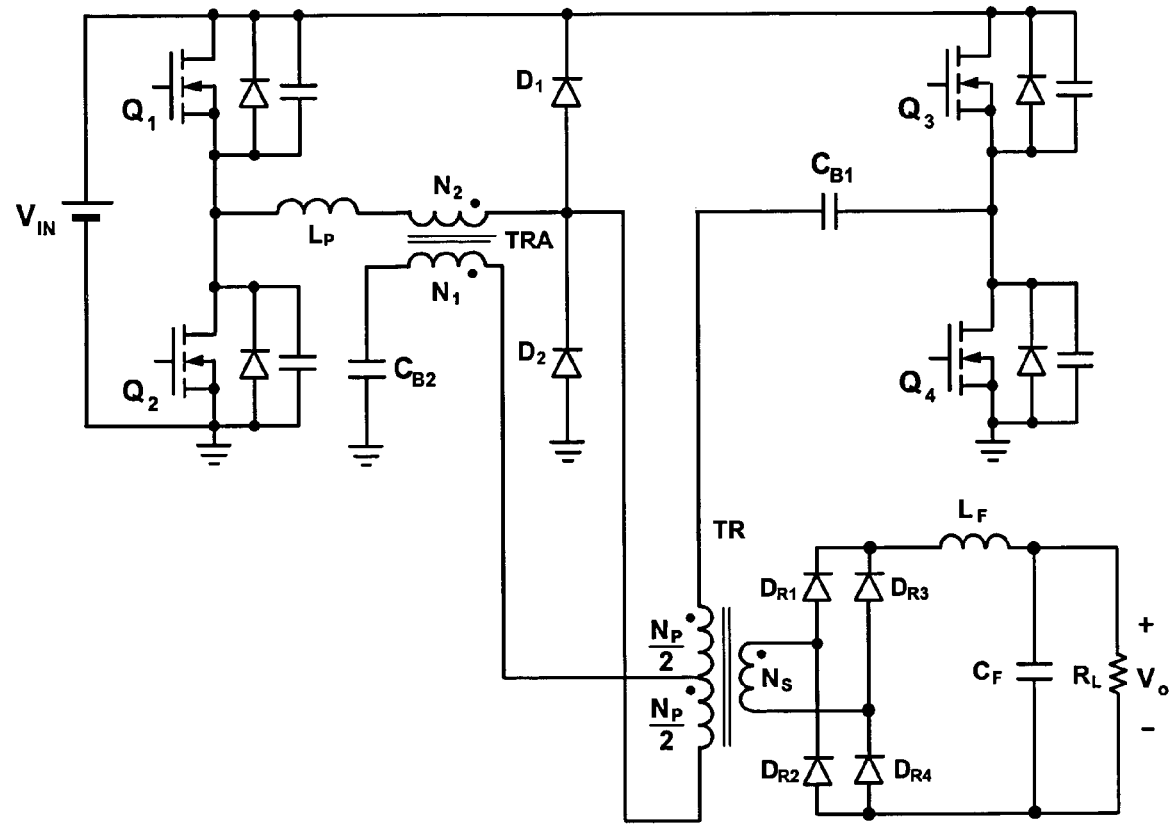
FIG. 17 shows the implementation of the converter of the invention with a full-bridge, full-wave rectifier.
Figure 18:
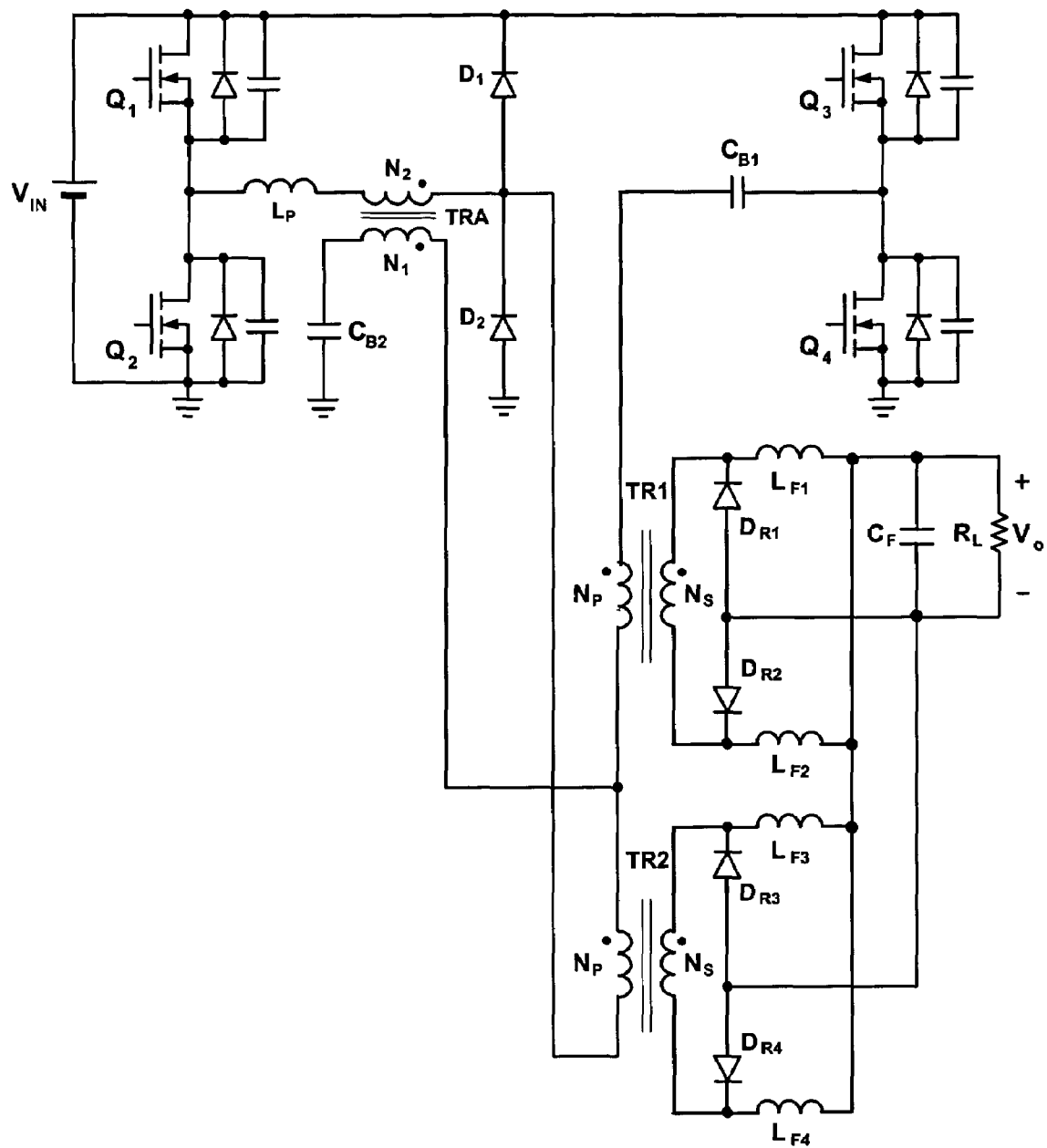
FIG. 18 shows an example of the implementation of the converter of the invention with two transformers.

The converter of the invention shown in FIG. 4 and any of its variations can be implemented with any type of secondary-side rectifier. FIGS. 16 and 17 show implementations with a current doubler and a full-bridge full-wave rectifier, respectively. Furthermore, the circuits of this invention can also be implemented with multiple transformers as, for example, shown in FIG. 18.

Figure 19:
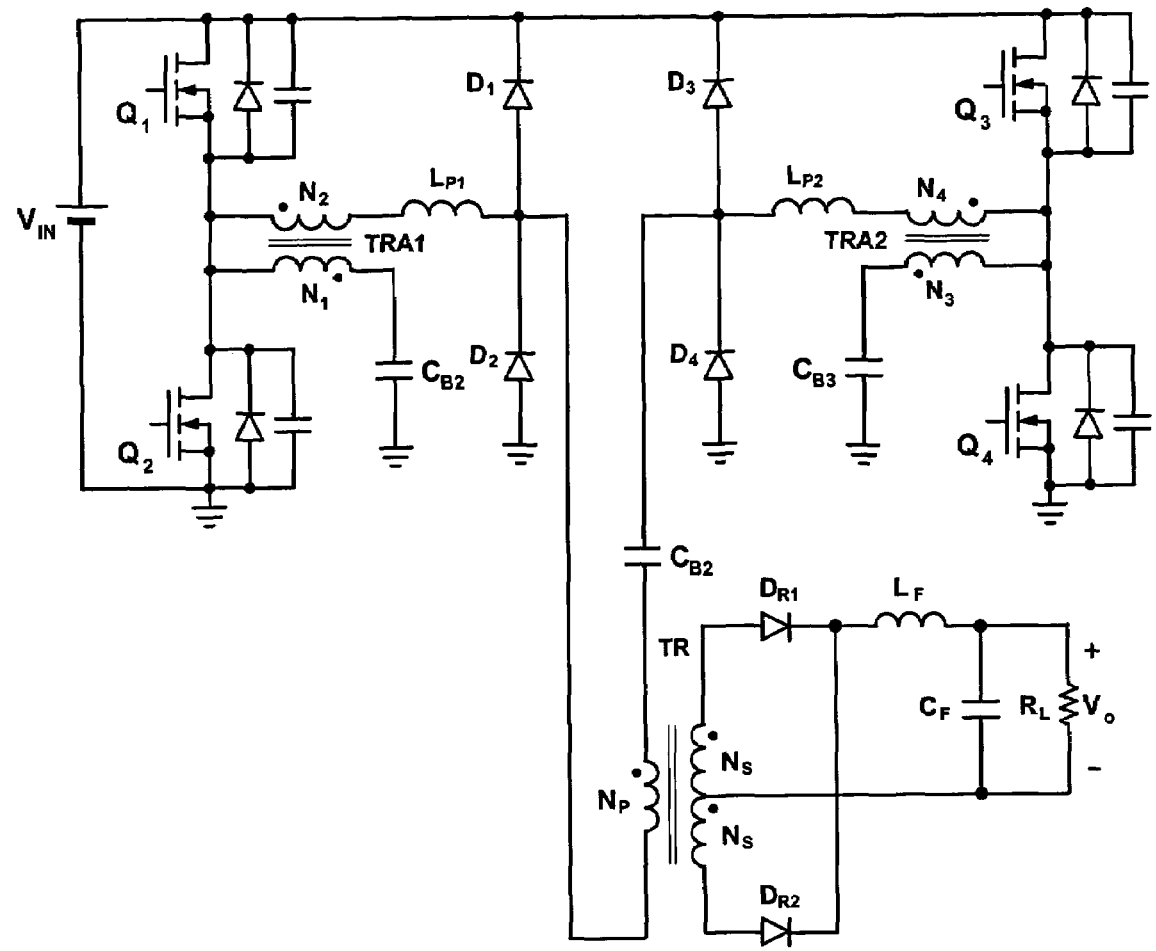
FIG. 19 shows an example of the implementation of the converter of the invention with ZVS commutation circuits employed in two bridge legs.
Figure 20:
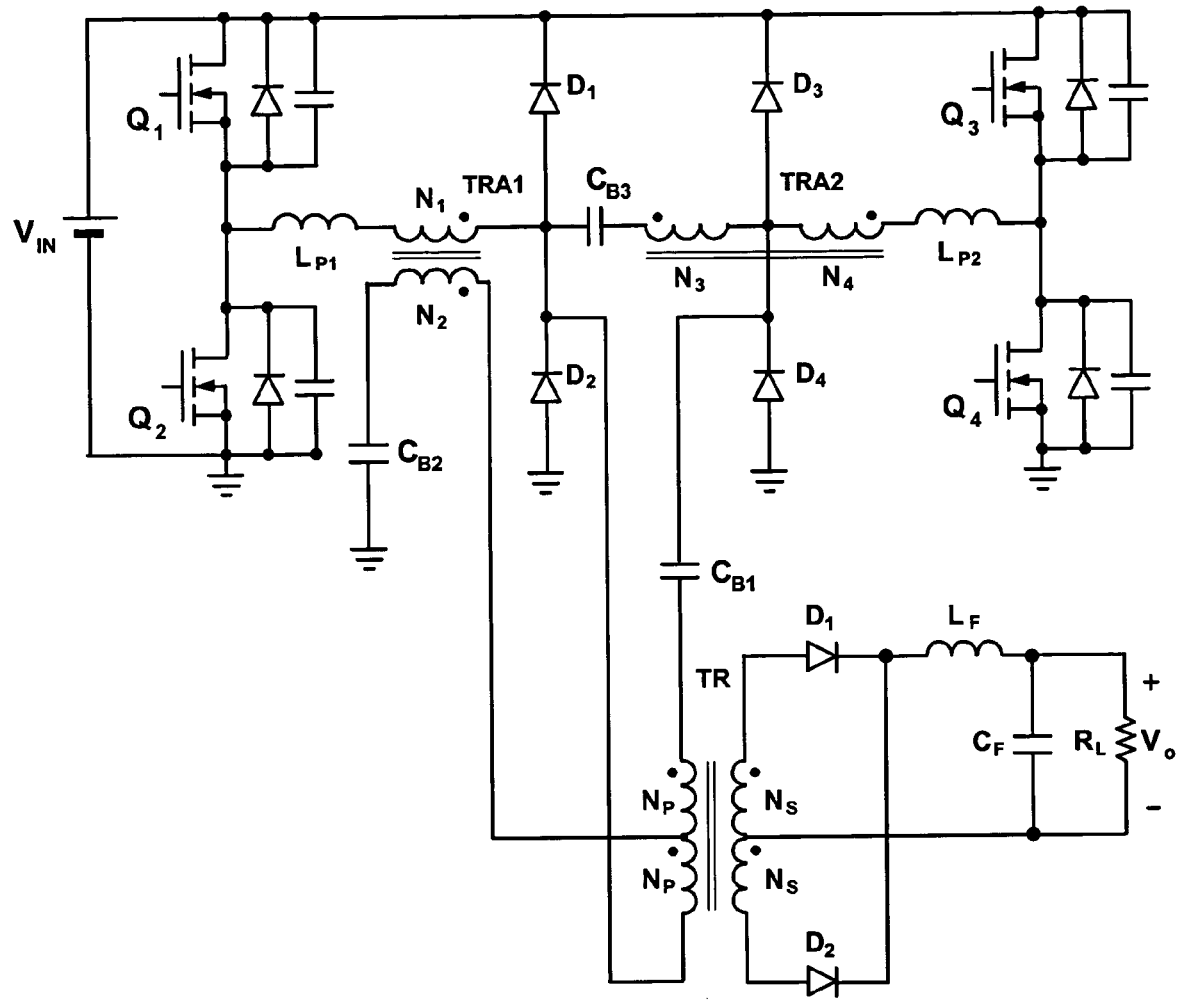
FIG. 20 shows another example of the implementation of the converter of the invention with ZVS commutation circuits employed in both bridge legs.

Finally, the circuit of this invention can also be implemented with the described ZVS commutation network consisting of an auxiliary transformer and a primary inductance connected to each of the bridge legs, as shown in FIGS. 19 and 20. Under this arrangement, the lagging-leg switches $Q_3$ and $Q_4$ use a ZVS commutation network to achieve ZVS in a wide load and input-voltage range. Of course, the lagging-leg switches $Q_3$ and $Q_4$ can use the energy stored in the output-filter inductor to create the ZVS conditions.

It should be noted that the circuit of this invention could also be implemented with a primary-side ZVS commutating network consisting of a primary inductor, an auxiliary transformer, and a pair of diodes connected to each of the bridge-legs.

The control of the circuits of this invention is the same as the control of any other constant-frequency FB ZVS converter. In fact, any of the integrated phase-shift controllers or PMW controllers available on the market can be used to implement the control of the proposed circuit.

Finally, it also should be noted the above detailed descriptions are provided to illustrate specific embodiments of the present invention and are not intended to be limiting. Numerous other variations and modifications within the scope of this invention are possible. The present invention is set forth in the following claims.

We claim:

1. A power converter, comprising:
   an input port for receiving an input power source;
   an output port for supplying current to a load;
   at least one power transformer having a primary side coupled to said input port and a secondary side coupled to the output port;
   a controller for regulating load current;
   one or more controllable switching devices on the primary side of the power transformer operating under the control of the controller; and
   at least one alternating energy source that isolates the at least one power transformer from said one or more controllable switching devices.

2. The power converter of claim 1, wherein the energy supplied by said alternating energy source creates a condition to turn on the one or more controllable switching devices at a substantially zero voltage.

3. The power converter of claim 1, wherein the energy supplied by said alternating energy source is dependent on at least one of load current and input power source changes.

4. The power converter of claim 1, wherein the energy supplied by said alternating energy source is independent of current changes within the converter.

5. The power converter of claim 1 further including at least one primary inductor for storing the energy supplied by said alternating energy source.

6. The power converter of claim 5, wherein said at least one primary inductor comprises a single winding.

7. A power converter as in claim 5, wherein said at least one primary inductor comprises a plurality of windings.

8. The power converter of claim 1 further comprising at least one pair of diodes for coupling said alternating energy source to a primary inductor.

9. The power converter of claim 1, wherein the control circuit periodically switches said one or more controllable switching devices.

10. The power converter of claim 1, wherein the control circuit periodically switches said one or more controllable switching devices in response to at least one of load current and input power source changes.

11. The power converter of claim 1, further including a full bridge comprising a first leg that includes a first pair of controllable switching devices and a second leg that includes a second pair of controllable switching devices.

12. The power converter of claim 11, wherein the controller controls the operation of the first pair of controllable switching devices and the second pair of controllable switching devices based on a phase-shift caused by at least one of load current and input power source changes.

13. The power converter of claim 11 further including a first primary inductor for storing energy required to create conditions for switching the first pair of controllable switching devices at substantially reduced voltage, and a second primary inductor for storing energy required to create conditions for turning on the second pair of controllable switching devices at substantially reduced voltage.

14. The power converter of claim 1 further comprising a full-wave rectifier at the secondary side of the power transformer.

15. The power converter of claim 1 further comprising a current doubler rectifier at the secondary side of the power transformer.

16. The power converter of claim 1 further comprising a filter at the secondary side of the power transformer.

17. The power converter of claim 8, wherein said alternating energy source comprises an auxiliary transformer having a first winding and a second winding.

18. The power converter of claim 17, wherein said auxiliary transformer has a leakage inductance for storing the energy that creates the conditions for switching said one or more controllable switching devices at a substantially low voltage.

19. The power converter of claim 17, wherein said first winding of said auxiliary transformer is coupled in series with an energy-storage capacitor; said series combination of said first winding of said auxiliary transformer and said energy-storage capacitor having a first and second terminal; said first terminal connected to a tap of said primary winding of said power transformer and said second terminal connected to a point with a constant potential.

20. The power converter of claim 19, wherein the tap is the center tap of said primary winding of said power transformer.

21. The power converter of claim 17, wherein said first winding of said auxiliary transformer is coupled in series with an energy-storage capacitor; said series combination of said first winding of said auxiliary transformer and said energy-storage capacitor having a first and second terminal; said first terminal coupled to a junction of said controllable switching devices and said second terminal connected to a point with a constant potential.

22. A power converter as in claim 17, wherein said second winding of said auxiliary transformer is coupled in series with a primary winding of said power transformer and a primary inductor that is used to store energy supplied by said alternating energy device.

23. The power converter of claim 17, wherein a first diode of said pair of diodes periodically coupling said second winding of said auxiliary transformer to said primary inductor when the voltage across said second winding of said auxiliary transformer is positive; said second diode periodically coupling said second winding of said auxiliary transformer to said primary inductor when the voltage across said second winding of said auxiliary transformer is negative.

24. A power converter as in claim 14, wherein a combination of said second winding of said auxiliary transformer and said primary winding of said power transformer and said external inductor is coupled between said first and second bridge legs.

25. The power converter of claim 1, wherein a plurality of power transformer are used for power transfer from said input port to said output port, each said power transformer comprising a primary winding and a secondary winding, wherein said primary windings of said power transformers connected in series.

* * * * *